(12) United States Patent
Pillman et al.

(10) Patent No.: US 8,224,176 B1
(45) Date of Patent: Jul. 17, 2012

(54) COMBINED AMBIENT AND FLASH EXPOSURE FOR IMPROVED IMAGE QUALITY

(75) Inventors: Bruce Harold Pillman, Rochester, NY (US); John Norvold Border, Walworth, NY (US); Robert Paul Cloutier, Canandaigua, NY (US); Richard Bruce Wheeler, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/987,403

(22) Filed: Jan. 10, 2011

(51) Int. Cl.
*G03B 7/087* (2006.01)
*G03B 7/097* (2006.01)

(52) U.S. Cl. .......... 396/242; 348/364; 348/366

(58) Field of Classification Search .......... 396/52, 396/61, 167, 166, 242; 348/362, 364, 366
See application file for complete search history.

(56) References Cited

U.S. PATENT DOCUMENTS

| | | | |
|---|---|---|---|
| 3,971,065 A | 7/1976 | Bayer | |
| 4,311,371 A * | 1/1982 | Kobori et al. | 396/167 |
| 4,642,678 A | 2/1987 | Cok | |
| 4,774,574 A | 9/1988 | Daley et al. | |
| 5,124,740 A | 6/1992 | Wheeler | |
| 5,130,739 A | 7/1992 | O'Such et al. | |
| 5,189,511 A | 2/1993 | Parulski et al. | |
| 5,335,041 A | 8/1994 | Fox | |
| 5,493,335 A | 2/1996 | Parulski et al. | |
| 5,579,049 A * | 11/1996 | Shimaya et al. | 348/364 |
| 5,598,237 A | 1/1997 | McIntyre et al. | |
| 5,652,621 A | 7/1997 | Adams, Jr. et al. | |
| 5,668,597 A | 9/1997 | Parulski et al. | |
| 6,192,162 B1 | 2/2001 | Hamilton, Jr. et al. | |
| 6,292,218 B1 | 9/2001 | Parulski et al. | |
| 6,384,976 B1 | 5/2002 | Ishijima et al. | |
| 6,934,056 B2 | 8/2005 | Gindele et al. | |
| 7,164,531 B2 | 1/2007 | Yamamoto et al. | |
| 7,304,681 B2 * | 12/2007 | Larner et al. | 348/352 |
| 7,525,590 B2 * | 4/2009 | Murata et al. | 348/352 |
| 7,542,077 B2 | 6/2009 | Miki | |
| 7,657,164 B2 | 2/2010 | Nomura et al. | |
| 7,720,376 B2 | 5/2010 | Weinberg et al. | |
| 7,755,664 B2 * | 7/2010 | Kakinuma et al. | 348/208.1 |
| 7,764,880 B2 * | 7/2010 | Hamada | 396/157 |
| 2002/0093739 A1 | 7/2002 | Ishijima et al. | |
| 2006/0250515 A1 * | 11/2006 | Koseki et al. | 348/362 |
| 2006/0274156 A1 | 12/2006 | Rabbani et al. | |

(Continued)

OTHER PUBLICATIONS

Keelan et al., "ISO 20462, A psychophysical image quality measurement standard," in Image Quality and System Performance, Proc. of SPIE-IS&T Electronic Imaging, vol. 5294, pp. 181-189 (2004).

(Continued)

*Primary Examiner* — Christopher Mahoney
(74) *Attorney, Agent, or Firm* — Kevin E. Spaulding

(57) ABSTRACT

A method for capturing an improved archival image using an electronic image capture device having a flash, comprising: capturing at least two preview images of a scene at different capture times using the image capture device; determining a scene brightness; using a processor to analyze the captured preview images to determine a motion velocity for the scene; determining a flash exposure setting and an ambient exposure setting responsive to a ratio between the determined scene brightness and the determined motion velocity; and capturing an archival image using the determined flash exposure setting and the determined ambient exposure setting.

26 Claims, 11 Drawing Sheets

U.S. PATENT DOCUMENTS

| | | |
|---|---|---|
| 2007/0024931 A1 | 2/2007 | Compton et al. |
| 2007/0188617 A1 | 8/2007 | Stavely |
| 2007/0237414 A1 | 10/2007 | Cho et al. |
| 2007/0237506 A1 | 10/2007 | Minema et al. |
| 2007/0237514 A1* | 10/2007 | Pillman et al. ............... 396/153 |
| 2008/0094498 A1* | 4/2008 | Mori ............................ 348/352 |
| 2008/0101786 A1 | 5/2008 | Pozniansky et al. |
| 2009/0040364 A1 | 2/2009 | Rubner |

OTHER PUBLICATIONS

Bruce Pillman: "Camera Exposure Determination Based on a Psychometric quality Model", Signal Processing Systems (SIPS) 2010 IEEE Workshop On, Oct. 6, 2010-Oct. 8, 2010, pp. 339-344, XP002670115, ISSN: 1520-6130 Paragraph [0005]; figure 8.

* cited by examiner

COMBINED AMBIENT AND FLASH EXPOSURE FOR IMPROVED IMAGE QUALITY

CROSS-REFERENCE TO RELATED APPLICATIONS

Reference is made to commonly assigned, co-pending U.S. Application Publication No. 2011/0193990 to Pillman et al., entitled "Capture condition selection from brightness and motion," and to commonly assigned, co-pending U.S. patent application Ser. No. 12/943,328 to Stupak et al., entitled "Automatic engagement of image stabilization," both of which are incorporated herein by reference.

FIELD OF THE INVENTION

This invention pertains to the field of digital cameras and more particularly to the automatic use of flash and ambient illumination to capture and image with improved overall quality.

BACKGROUND OF THE INVENTION

Digital cameras with a multitude of operational features including but not limited to exposure control, white balance and auto focus, have been a consumer staple for decades. As camera complexity has increased, required actions by the user to operate digital cameras have also increased.

An electronic imaging system depends on a lens system to form an image on an image sensor in order to create an electronic representation of a visual image. Examples of such image sensors include charge coupled device (CCD) image sensors and active pixel sensor (APS) devices (APS devices are often referred to as CMOS sensors because of the ability to fabricate them in a Complementary Metal Oxide Semiconductor process). A sensor includes a two-dimensional array of individual picture element sensors, or pixels. Each pixel is typically provided with either a red, green, or blue filter, as for example described in commonly assigned U.S. Pat. No. 3,971,065, to Bayer, entitled "Color imaging array," so that a full color image can be produced. Regardless of the type of image sensor employed (e.g., CCD or CMOS) the pixel acts as a "bucket" in which photo-generated charge is accumulated in direct proportion to the amount of light that strikes the pixel during the capture of an image by the electronic imaging system.

The image sensor gathers light for an interval of time called the exposure time or integration time to make a correct exposure during image capture. Based on brightness measurements of the scene to be imaged, the electronic imaging system, typically with an autoexposure system, is employed to determine a suitable exposure time that will yield an image with effective brightness and an effective signal-to-noise ratio. The dimmer the scene, the longer the amount of time the electronic imaging system must use to gather light to make a correct exposure. If motion of objects in the scene relative to the image capture device is present during image capture, motion blur can be present in the captured image. Motion blur is caused when the relative motion between the camera and a point in the scene causes the point in the scene to be imaged over a number of pixels on the imager during the time of exposure. The motion blur during an exposure can be described by a motion blur point spread function, which quantifies the relative exposure of the point in the image onto each pixel during the time of exposure. If there is no motion blur, the motion blur point spread function is a simple spike (i.e., there is no motion blur). As the point moves more during exposure the motion blur point spread function spreads out to cover more pixels.

Motion blur can be caused by camera movement, in which case the motion in the projected image is largely the same throughout the image and can be described by a motion blur point spread function that is substantially constant throughout the image. This is referred to as global motion. It is also common for object(s) within the scene to move independently, such as a person moving within the scene. This is referred to as local motion and produces a different motion blur point spread function for the moving object than for other parts of the scene. Either or both of these types of motion may be present during composition and capture of a scene.

Global motion is normally easier to measure because only a small number of parameters, such as a single motion velocity vector, need to be estimated. Further, inertial devices such as gyroscope(s) or accelerometer(s) can be used to provide data on camera motion.

Both global and local motion are well described by velocity vectors (how quickly a point in the projected image is moving), which can be characterized by a direction and a speed quantified in pixels per second. Both local and global velocity can change with time, and the integral of the velocity over time provides information on the projected point's position over time. Increasing velocity or exposure time will generally increase the motion blur during an exposure. In contexts where it is unimportant whether a motion blur is due to local motion or global motion, the present disclosure uses the term scene motion.

A number of methods to reduce global motion blur are known to those in the field. One method is to use an image stabilization system. Such methods typically use an inertial measurement device (e.g., a gyroscope or an accelerometer) to measure the motion of the image capture device during capture and then use a special lens with a lens element or lens group that can be moved laterally to cause the image formed by the lens on the image sensor to move in a direction that compensates for the image capture device motion. In other embodiments, the image sensor itself can be moved laterally to compensate for the image capture device motion.

A method that can be used to correct for motion during the capture of video image is described in U.S. Patent Application Publication 2006/0274156 to Rabbani et al., "Image sequence stabilization method and camera having dual path image sequence stabilization." This approach is based on a digital shifting of individual frames in a captured video sequence to compensate for movement of the digital camera. While this method cannot reduce motion blur in a single frame, it is effective to stabilize a sequence of captured video images to reduce the effect of camera shake.

None of the above-described methods are effective to reduce the effects of local motion blur. One method to reduce local motion blur is to shorten the exposure time to a setting which is shorter than the exposure time selected by an autoexposure system that considers only scene brightness. The resulting images will be darker and will have a lower signal-to-noise ratio. An analog or digital gain can then be applied to the pixel values in the image to brighten the darker images, but those skilled in the art will recognize that this will result in noisier images.

U.S. Pat. No. 7,657,164 to Nomura et al., entitled "Subject shake detection device, imaging device, control method thereof, control program, and recording medium," describe the use of gyros and image analysis to estimate camera shake. The exposure time is adjusted to limit motion blur according to a predefined threshold.

U.S. Pat. No. 7,720,376 to Weinberg et al., entitled "Camera with acceleration sensor," teaches a camera with an acceleration sensor. A sensed acceleration is used in the process of determining a minimum shutter speed that should be used for a particular focal length.

U.S. Patent Application Publication 2007/0188617 to Stavely, entitled "Apparatus and method for reducing image blur in a digital camera," teaches determining camera motion information using motion sensors and image analysis. The motion information is used to control the moment of image capture to provide reduced motion blur.

Another method to reduce local motion blur is to gather more light using either a lens with a larger aperture or an image sensor with larger pixels, thereby enabling the use of a shorter exposure time. This approach can produce images with reduced motion blur and acceptable noise levels. However, the current industry trend in electronic imaging systems is to make image capture devices more compact and less expensive. High-grade optical elements with large apertures and image sensors with larger pixels are substantially more expensive, and are therefore not practical for many applications.

Another method to reduce local motion blur is to supplement the available light with a photographic flash in order to reduce the effective exposure time. A photographic flash produces a strong light flux that is sustained for a small fraction of a second. The photographic flash can be an electronic flash with a xenon tube, a light emitting diode (LED) or an array of LEDs, or some other light source controlled or triggered when the camera is capturing an image. The actual exposure time can be set to a short value which is marginally longer than the flash duration. Therefore, the motion blur caused by either global or local motion during the exposure can be significantly reduced. However, flashes are not effective in bright lighting and fast moving objects in bright lighting can still produce local motion blur. In addition, flash photography is typically only useful if the distance between the flash and the scene being photographed is small. Flash photography also tends to produce artifacts such as red eyes and very bright areas or dark areas in the captured image, which many people find objectionable.

Methods that can mitigate local motion blur are generally effective against global motion blur as well, but have the limitations described above.

Conventional solutions for selecting exposure time typically use one or more standardized settings, or respond to operator mode settings to obtain an exposure time. FIG. 1 shows a flow chart of a typical exposure control system 200 for a digital camera performing autoexposure. In assess scene brightness step 210, the camera assesses the scene brightness either with a scene brightness sensor or with an analysis of a preview image. In determine capture mode step 220, a capture mode setting 225 is determined based on the measured scene brightness and any operator-selected user interface settings or standardized settings. In determine exposure index step 230, the exposure index setting 235 (EI) is determined in accordance with the measured scene brightness and the capture mode setting 225. Those skilled in the art will recognize that exposure index is a standard way to quantify the amount of light necessary for a good exposure. For film-based cameras, the exposure index is usually set based on the film speed, or ISO rating, which is related to the film sensitometry. Conversely, in digital cameras, the exposure index (EI) is often set based on a number of factors including scene brightness, and the effective ISO of the digital camera is adjusted to largely match the EI. In determine aperture step 240, an aperture setting 245 is determined to control the f-number of the camera lens in accordance with the measured scene brightness, the capture mode setting 225 and the exposure index setting 235. An exposure time setting 255 ($t$) is then determined in determine exposure time step 250 in accordance with the scene brightness, the capture mode setting 225, the exposure index setting 235 and the aperture setting 245. It should be noted that these steps are not necessarily performed in the order shown in FIG. 1. After the various settings have been determined, a capture digital image step 260 is used to capture and store a digital image 265. However, the method of the typical camera control system 200 is prone to capture images with poor perceived image quality because the degree of brightness and motion in the scene can be highly variable and since motion is not taken into account, disappointing levels of motion blur or noise can be present in the images.

U.S. Patent Application Publication 2007/0237514 to Pillman et al., entitled "Varying camera self-determination based on subject motion," teaches a method for capturing digital images where motion in the scene is measured prior to image capture. Various camera settings are adjusted responsive to the determined scene motion. If slow or no scene motion is detected, then additional analysis is done to help select a capture mode setting 225 for the digital camera. If rapid scene motion is detected, then a capture mode setting 225 suitable for sports photography is selected for use by the exposure control system 200 as presented in FIG. 1. The sports capture mode would limit exposure time and use a higher exposure index setting 235 than a typical default capture mode. As such, the method of Pillman primarily provides an improved method for capture of scenes with significant scene motion.

In U.S. Patent Application Publication 2007/0237506 to Minema et al., entitled "Image blurring reduction," a camera is described wherein an image is captured at a slower shutter speed if no camera motion is detected. If camera motion is detected, then an image is captured at a faster shutter speed. While this method does reduce motion blur in images, it does not address the combined effects of motion blur and noise in the image on the perceived image quality of the image in selecting capture conditions including exposure time and ISO.

U.S. Pat. No. 5,598,237 to McIntyre et al., entitled "Image capture apparatus," describes an image capture apparatus operable in a hand-held condition and in a stabilized non-hand-held condition. Different exposure parameters are selected depending on whether the camera is being used in the hand-held condition.

U.S. Patent Application Publication 2009/0040364 to Rubner, entitled "Adaptive Exposure Control," teaches using a multiple image capture process to reduce image quality artifacts including motion blur. FIG. 2 shows a flow chart summarizing this method. In capture first image step 270, a first image is captured using exposure conditions defined by the camera autoexposure control system (e.g., the exposure control system 200 as presented in FIG. 1). In analyze image for deficiencies step 275, the first image is analyzed for aspects of image quality such as overexposure, underexposure, motion blur, dynamic range or depth of field to determine which aspects have been met and where deficiencies remain. Based on this analysis, a remaining deficiencies test 280 is used to check whether any deficiencies remain in the aspects of image quality. If some deficiencies remain, the process proceeds to update exposure parameters step 282 where new exposure parameters are set for at least one additional image. Capture additional image step 272 is then used to capture an additional image using the new exposure parameters. The additional image is then analyzed with the analyze image for deficiencies step 275. This process repeats until the remaining deficiencies test 280 determines that all the aspects of image quality have been met amongst the multiple images that have been captured. A final image is then constructed by combining portions of the multiple captured images using a combine captured images step 285 in such a way that all the aspects of image quality desired are met. However, the method of Rubner does not address motion related image quality issues in applications which require capturing only a single captured image.

U.S. Patent Application Publication 2008/0101786 to Pozniansky et al., entitled "Control of artificial lighting of a scene to reduce effects of motion in the scene on an image being acquired," describes a method for using artificial illumination to acquire an improved image based on motion analysis. This application teaches use of scene luminance thresholds and a motion blur threshold to determine when flash should be used. This application adds a motion threshold to complement the well known use of a scene luminance threshold in controlling flash. In their FIG. 10, they combine flash and ambient exposure based on thresholds for scene luminance and motion blur. The approach of Pozniansky et al. does not teach a method for continuously blending ambient and flash exposure for preferred exposure control.

U.S. Pat. No. 5,124,740 to Wheeler, entitled "Depth number based technique for selecting lens aperture size and flash parameters for a full flash exposure," describes a method for controlling a flash and various system parameters to optimize exposure for still image capture. In particular, Wheeler teaches the use of a depth number as well as a guide number to optimize aperture (f-number) selection.

U.S. Pat. No. 5,130,739 to O'Such et al., entitled "Automatic optimization of photographic exposure parameters through determination and utilization of extra system speed," describes a method for controlling flash and ambient exposure to obtain improved image quality. This patent effectively teaches the adjustment of camera exposure to maximize an overall quality objective, even if that means capturing a scene at an exposure index other than the nominal ISO of film loaded into the camera.

The Wheeler and O'Such et al. patents describe optimization of image capture parameters accounting for many system factors, such as focal length, available flash power, subject distance, ambient illumination, and system speed. However, no explicit motion information is used to improve scene capture, as motion estimation was not taught or used in this art.

As shown by the cited prior art, cameras usually enable flash based only on scene brightness, enabling flash if the scene brightness is below a threshold. Further, present cameras tend to switch over to only flash exposure if the scene brightness is below the threshold. When the subject distance is large relative to the flash power available, a flash-only exposure will also be of poor quality. In such situations, it is preferred to use exposure from both flash and ambient illumination, using an exposure time that allows for significant ambient exposure, not just synchronization with the flash.

In some cases, it is desirable to capture an image with low flash power, either to conserve energy or to capture an image without waiting for the flash capacitor to fully charge. Of the cited prior art, only Wheeler and O'Such address this issue, but neither of them use knowledge of motion.

There remains a need for a method to automatically fully utilize flash (camera-controlled illumination) and ambient illumination when photographing scenes over a wide range of subject distance, scene illumination, and scene velocity.

SUMMARY OF THE INVENTION

The present invention represents a method for capturing an improved archival image using an electronic image capture device having a flash, comprising:

capturing at least two preview images of a scene at different capture times using the image capture device;

determining a scene brightness;

using a processor to analyze the captured preview images to determine a motion velocity for the scene;

determining an flash exposure setting and an ambient exposure setting responsive to a ratio between the determined scene brightness and the determined motion velocity; and capturing an archival image using the determined flash exposure setting and the determined ambient exposure setting.

In a preferred embodiment the determination of the ambient exposure setting is responsive to an image quality function, the image quality function providing an estimate of perceived image quality as a function of a total exposure index and a motion blur level, the total exposure index being related to the flash exposure setting and the ambient exposure setting and the motion blur level being related to the determined motion velocity.

This invention has the advantage that the image quality of the captured archival image will be improved by providing a preferred balance between motion blur artifacts and image noise artifacts.

It has the additional advantage that the use of an flash to supplement the ambient illumination on the scene can enable the use of shorter exposure times than would be possible with an ambient only exposure, thereby reducing the amount of motion blur while simultaneously enabling the control of the total exposure index in order to provide the preferred balance between motion blur artifacts and image noise artifacts.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
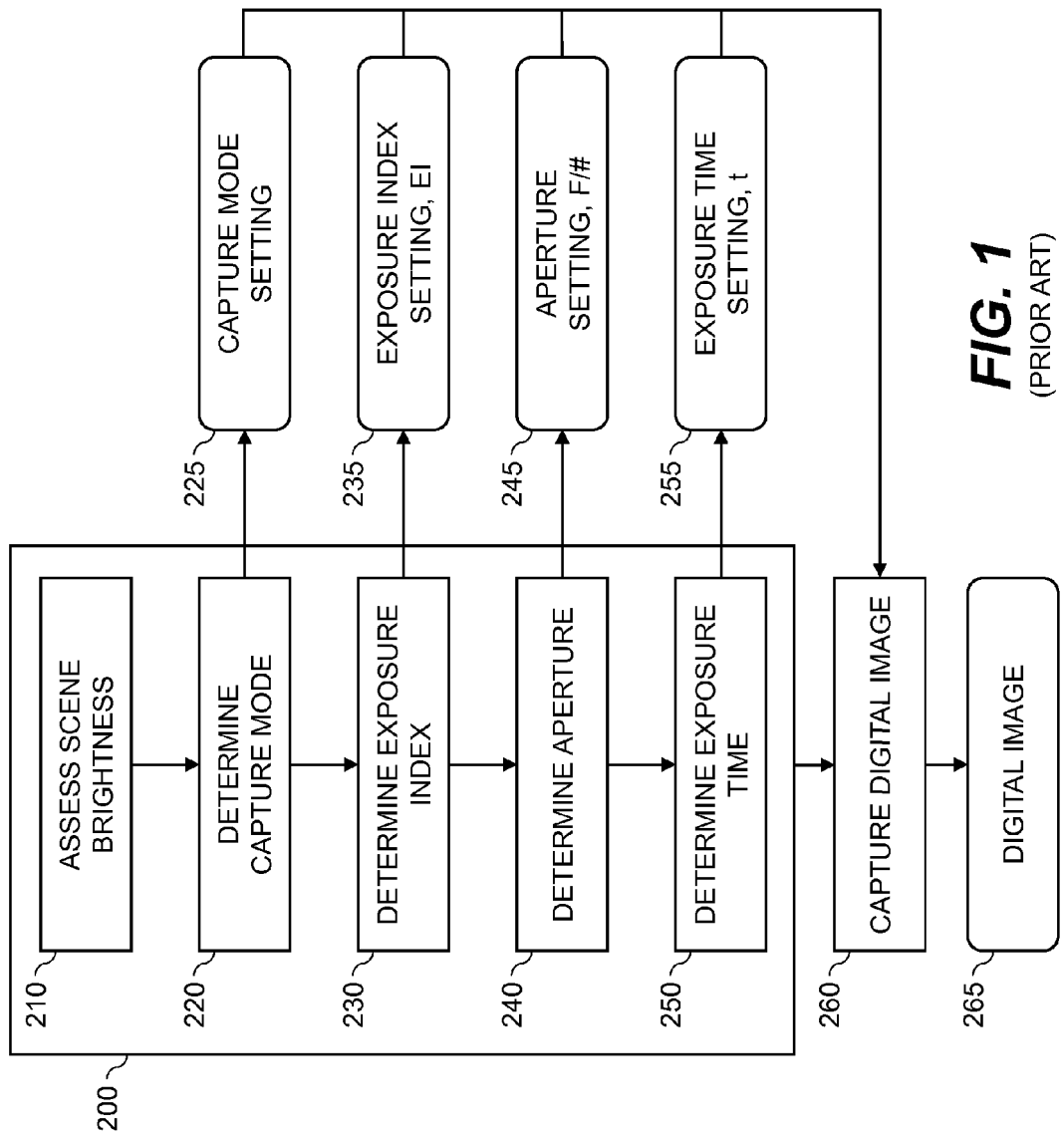
FIG. 1 is a flowchart illustrating a method for controlling exposure according to prior art.
Figure 2:
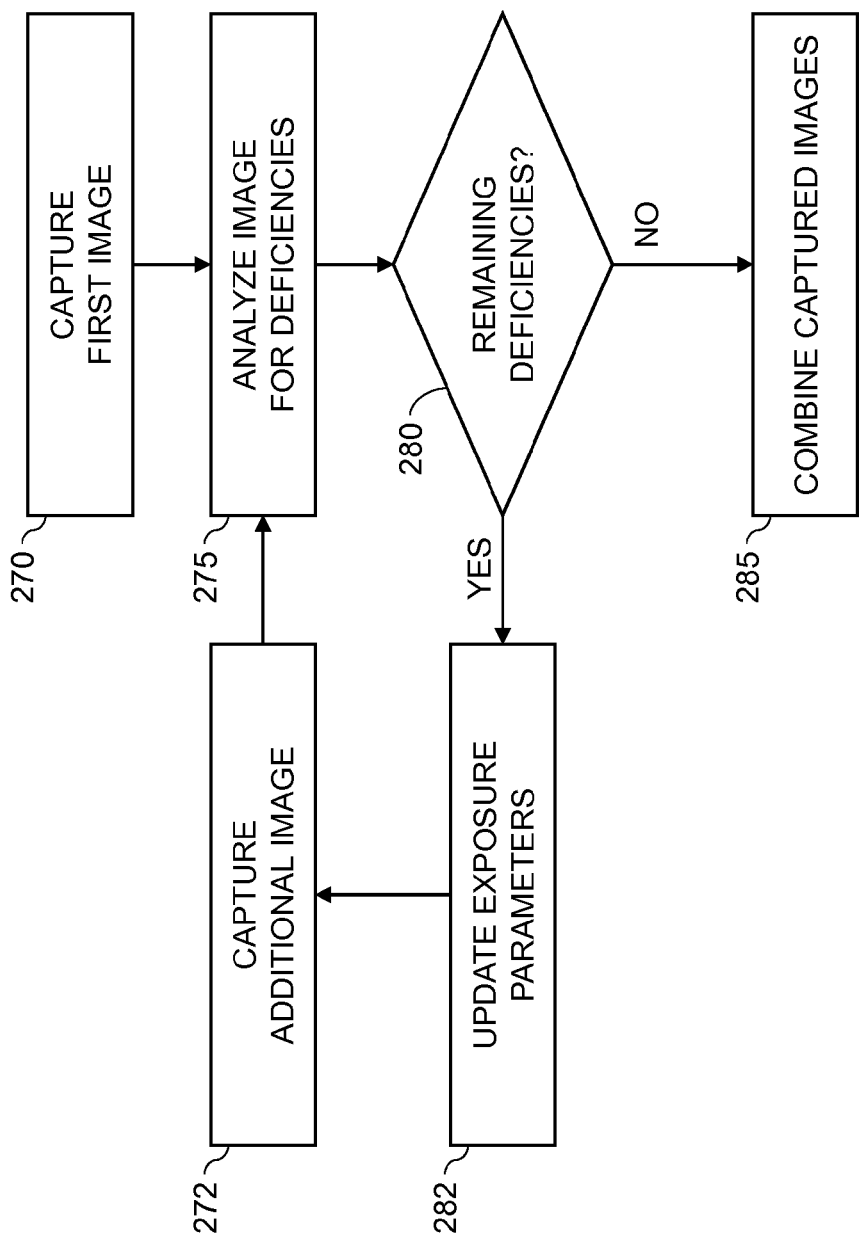
FIG. 2 is a flowchart depicting a prior art method of capturing multiple images to provide an improved image.

In the following description, a preferred embodiment of the present invention will be described in terms that would ordinarily be implemented as a software program. Those skilled in the art will readily recognize that the equivalent of such software can also be constructed in hardware. Because image manipulation algorithms and systems are well known, the present description will be directed in particular to algorithms and systems forming part of, or cooperating more directly with, the system and method in accordance with the present invention. Other aspects of such algorithms and systems, and hardware or software for producing and otherwise processing the image signals involved therewith, not specifically shown or described herein, can be selected from such systems, algorithms, components and elements known in the art. Given the system as described according to the invention in the following materials, software not specifically shown, suggested or described herein that is useful for implementation of the invention is conventional and within the ordinary skill in such arts.

Still further, as used herein, a computer program for performing the method of the present invention can be stored in a computer readable storage medium, which can include, for example; magnetic storage media such as a magnetic disk (such as a hard drive or a floppy disk) or magnetic tape; optical storage media such as an optical disc, optical tape, or machine readable bar code; solid state electronic storage devices such as random access memory (RAM), or read only memory (ROM); or any other physical device or medium employed to store a computer program having instructions for controlling one or more computers to practice the method according to the present invention.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Because digital cameras employing imaging devices and related circuitry for signal capture and processing, and display are well known, the present description will be directed in particular to elements forming part of, or cooperating more directly with, the method and apparatus in accordance with the present invention. Elements not specifically shown or described herein are selected from those known in the art. Certain aspects of the embodiments to be described are provided in software. Given the system as shown and described according to the invention in the following materials, software not specifically shown, described or suggested herein that is useful for implementation of the invention is conventional and within the ordinary skill in such arts.

The following description of a digital camera will be familiar to one skilled in the art. It will be obvious that there are many variations of this embodiment that are possible and are selected to reduce the cost, add features or improve the performance of the camera.

Figure 3:
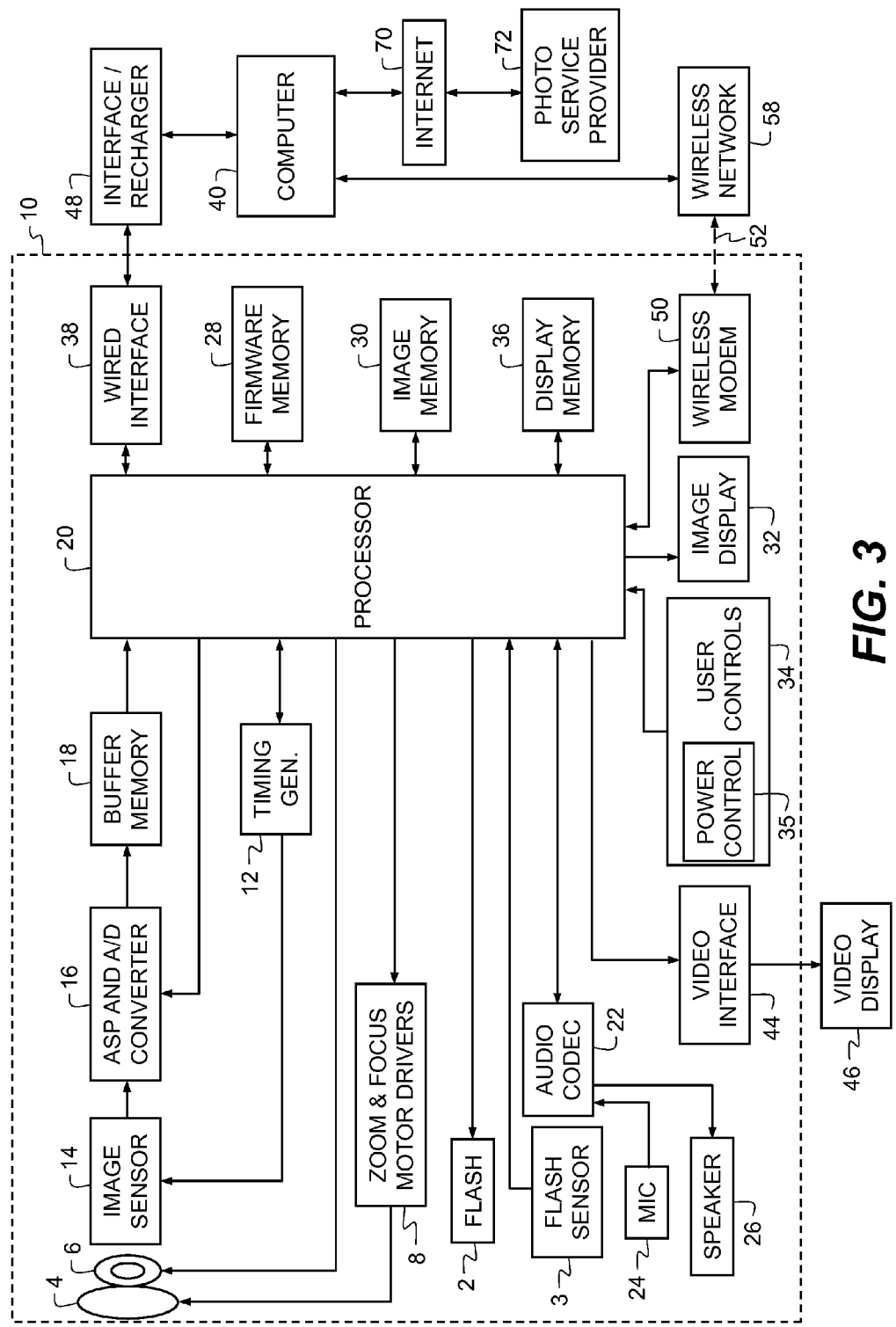
FIG. 3 is a high-level diagram showing the components of a system for capturing digital images according to an embodiment of the present invention.

FIG. 3 depicts a block diagram of a digital photography system, including a digital camera 10 in accordance with the present invention. Preferably, the digital camera 10 is a portable battery operated device, small enough to be easily handheld by a user when capturing and reviewing images. The digital camera 10 produces digital images that are stored as digital image files using image memory 30. The phrase "digital image" or "digital image file", as used herein, refers to any digital image file, such as a digital still image or a digital video file.

In some embodiments, the digital camera 10 captures both motion video images and still images. The digital camera 10 can also include other functions, including, but not limited to, the functions of a digital music player (e.g. an MP3 player), a mobile telephone, a GPS receiver, or a programmable digital assistant (PDA).

The digital camera 10 includes a lens 4 having an adjustable aperture and adjustable shutter 6. In a preferred embodiment, the lens 4 is a zoom lens and is controlled by zoom and focus motor drivers 8. The lens 4 focuses light from a scene (not shown) onto an image sensor 14, for example, a single-chip color CCD or CMOS image sensor. The lens 4 is one type optical system for forming an image of the scene on the image sensor 14. In other embodiments, the optical system may use a fixed focal length lens with either variable or fixed focus.

The output of the image sensor 14 is converted to digital form by Analog Signal Processor (ASP) and Analog-to-Digital (A/D) converter 16, and temporarily stored in buffer memory 18. The image data stored in buffer memory 18 is subsequently manipulated by a processor 20, using embedded software programs (e.g. firmware) stored in firmware memory 28. In some embodiments, the software program is permanently stored in firmware memory 28 using a read only memory (ROM). In other embodiments, the firmware memory 28 can be modified by using, for example, Flash EPROM memory. In such embodiments, an external device can update the software programs stored in firmware memory 28 using the wired interface 38 or the wireless modem 50. In such embodiments, the firmware memory 28 can also be used to store image sensor calibration data, user setting selections and other data which must be preserved when the camera is turned off. In some embodiments, the processor 20 includes a program memory (not shown), and the software programs stored in the firmware memory 28 are copied into the program memory before being executed by the processor 20.

It will be understood that the functions of processor 20 can be provided using a single programmable processor or by using multiple programmable processors, including one or more digital signal processor (DSP) devices. Alternatively, the processor 20 can be provided by custom circuitry (e.g., by one or more custom integrated circuits (ICs) designed specifically for use in digital cameras), or by a combination of programmable processor(s) and custom circuits. It will be understood that connectors between the processor 20 from some or all of the various components shown in FIG. 3 can be made using a common data bus. For example, in some embodiments the connection between the processor 20, the buffer memory 18, the image memory 30, and the firmware memory 28 can be made using a common data bus.

The processed images are then stored using the image memory 30. It is understood that the image memory 30 can be any form of memory known to those skilled in the art including, but not limited to, a removable Flash memory card, internal Flash memory chips, magnetic memory, or optical memory. In some embodiments, the image memory 30 can include both internal Flash memory chips and a standard interface to a removable Flash memory card, such as a Secure Digital (SD) card. Alternatively, a different memory card format can be used, such as a micro SD card, Compact Flash (CF) card, MultiMedia Card (MMC), xD-Picture Card™ or Memory Stick.

The image sensor 14 is controlled by a timing generator 12, which produces various clocking signals to select rows and pixels and synchronizes the operation of the ASP and A/D converter 16. The image sensor 14 can have, for example, 12.4 megapixels (4088×3040 pixels) in order to provide a still image file of approximately 4000×3000 pixels. To provide a color image, the image sensor is generally overlaid with a color filter array, which provides an image sensor having an array of pixels that include different colored pixels. The different color pixels can be arranged in many different patterns. As one example, the different color pixels can be arranged using the well-known Bayer color filter array, as described in commonly assigned U.S. Pat. No. 3,971,065, cited earlier, the disclosure of which is incorporated herein by reference. As a second example, the different color pixels can be arranged as described in commonly assigned U.S. Patent Application Publication 2007/0024931 to Compton et al., entitled "Image sensor with improved light sensitivity," the disclosure of which is incorporated herein by reference. These examples are not limiting, and many other color patterns may be used.

It will be understood that the image sensor 14, timing generator 12, and ASP and A/D converter 16 can be separately fabricated integrated circuits, or they can be fabricated as a single integrated circuit as is commonly done with CMOS image sensors. In some embodiments, this single integrated circuit can perform some of the other functions shown in FIG. 3, including some of the functions provided by processor 20.

The image sensor 14 is effective when actuated in a first mode by timing generator 12 for providing a motion sequence of lower resolution sensor image data, which is used when capturing video images and also when previewing a still image to be captured, in order to compose the image. This preview mode sensor image data can be provided as HD resolution image data, for example, with 1920×10280 pixels or 1280×720 pixels, or as VGA resolution image data, for example, with 640×480 pixels, or using other resolutions which have significantly fewer columns and rows of data, compared to the resolution of the image sensor.

The preview mode sensor image data can be provided by combining values of adjacent pixels having the same color, or by eliminating some of the pixel values, or by combining some color pixel values while eliminating other color pixel values. The preview mode image data can be processed as described in commonly assigned U.S. Pat. No. 6,292,218 to Parulski, et al., entitled "Electronic camera for initiating capture of still images while previewing motion images," which is incorporated herein by reference.

The image sensor 14 is also effective when actuated in a second mode by timing generator 12 for providing high resolution still image data. This final mode sensor image data is provided as high resolution output image data, which for scenes having a high illumination level includes all of the pixels of the image sensor, and can be, for example, a 12 megapixel final image data having 4000×3000 pixels. At lower illumination levels, the final sensor image data can be provided by "binning" some number of like-colored pixels on the image sensor, in order to increase the signal level and thus the "ISO speed" of the sensor.

The zoom and focus motor drivers 8 are controlled by control signals supplied by the processor 20, to provide the appropriate focal length setting and to focus the scene onto the image sensor 14. The exposure level of the image sensor 14 is controlled by controlling the f/number and exposure time of the adjustable aperture and adjustable shutter 6, the exposure period of the image sensor 14 via the timing generator 12, and the gain (i.e., ISO speed) setting of the ASP and A/D converter 16. The processor 20 also controls a flash 2 which can illuminate the scene. The "ISO speed" of an image sensor is used to quantify the amount of light needed for a normally exposed image. Changes in analog gain and digital gain can change this, though usually with an increase in image noise (a reduction in the signal-to-noise ratio). When determining exposure settings for a particular scene, it is preferred to consider exposure index (EI), since that quantifies how much light is collected for a capture. Usually, gain changes are used to adjust the "ISO speed" of the camera to equal the EI chosen for autoexposure control. This is done to help render images captured at different EI values in a pleasing fashion for display or other use. Because they are usually numerically identical (camera ISO is adjusted to equal the EI used in exposure calculations), the two terms will be used interchangeably here. As used here, gain can be applied in the analog signal processing chain, as a digital factor, or with any combination of the two. Those skilled in the art will recognize that gain can be implemented with a multiplicative factor when operating on data linear with exposure, an additive offset when operating on data that is logarithmic with exposure, with a lookup table adjusting the camera's tone curve, or any combination of these operations.

The exposure can be determined by an autoexposure control. The autoexposure control can be implemented within the processor 20 and can be selected from those known in the art, an example of which is disclosed in U.S. Pat. No. 5,335,041 to Fox, entitled "Exposure and focus system for a zoom camera." Based on brightness measurements of a scene to be imaged either as provided by a brightness sensor or as provided by measurements from pixel values in preview images, the electronic imaging system typically employs autoexposure control processing to determine an effective exposure time, t, that will yield an image with effective brightness and good signal-to-noise ratio. In the present invention, the exposure time determined by the autoexposure control, t, is used for capture of the preview images and then modified for the capture of an archival image capture based on scene brightness and anticipated motion blur. Where the archival image is the final image that is captured after the capture conditions (including exposure time) have been defined based on the method of the invention. One skilled in the art will recognize that the shorter the exposure time, the less motion blur and more noise will be present in the archival image.

The digital camera 10 of FIG. 3 includes a flash 2, which has an electronically controlled illuminator such as a xenon flash tube (labeled "FLASH" in FIG. 3). This flash can also be a light emitting diode (LED), array of LEDs, or some other type of light source. A flash sensor 3 can optionally be provided, which outputs a signal responsive to the light sensed from the scene during archival image capture or by way of a pre-flash prior to archival image capture. Alternatively, flash output can be fixed or varied based upon other information, such as focus distance.

The lens 4 of the digital camera 10 can be focused in the first mode by using "through-the-lens" autofocus, as described in commonly-assigned U.S. Pat. No. 5,668,597 to Parulski et al., entitled "Electronic camera with rapid automatic focus of an image upon a progressive scan image sensor," which is incorporated herein by reference. This is accomplished by using the zoom and focus motor drivers 8 to adjust the focus position of the lens 4 to a number of positions ranging between a near focus position to an infinity focus position, while the processor 20 determines the closest focus position which provides a peak sharpness value for a central portion of the image captured by the image sensor 14. The focus distance which corresponds to the closest focus position can then be utilized for several purposes, such as automatically setting an appropriate scene mode, and can be stored as metadata in the image file, along with other lens and camera settings.

The processor 20 produces menus and low resolution color images that are temporarily stored in display memory 36 and are displayed on the image display 32. The image display 32 is typically an active matrix color liquid crystal display (LCD), although other types of displays, such as organic light emitting diode (OLED) displays, can be used. A video interface 44 provides a video output signal from the digital camera 10 to a video display 46, such as a flat panel HDTV display. In preview mode, or video mode, the digital image data from buffer memory 18 is manipulated by processor 20 to form a series of motion preview images that are displayed, typically as color images, on the image display 32. In review mode, the images displayed on the image display 32 are produced using the image data from the digital image files stored in image memory 30.

The graphical user interface displayed on the image display 32 is controlled in response to user input provided by user controls 34. The user controls 34 are used to select various camera modes, such as video capture mode, still capture mode, and review mode, and to initiate capture of still images and recording of motion images. User controls 34 typically include some combination of buttons, rocker switches, joysticks, or rotary dials. In some embodiments, some of the user controls 34 are provided by using a touch screen overlay on the image display 32. In other embodiments, additional status displays or images displays can be used. In a preferred embodiment, the user controls 34 include a power control 35 (e.g., a power button) which is used to turn on or off the camera, as well as other controls such as a lens control to control the lens 4, and an image capture control (e.g., a shutter button) to initiate an image capture operation. In some embodiments, the still preview mode is initiated when the camera is powered on, or when the user awakens the camera from a power-saving mode by partially depressing the shutter button, and the still image capture mode is initiated when the user fully depresses the shutter button. In some embodiments the shutter button is used to start and stop video capture.

The camera modes that can be selected using the user controls 34 include a "timer" mode. When the "timer" mode is selected, a short delay (e.g., 10 seconds) occurs after the user fully presses the shutter button, before the processor 20 initiates the capture of a still image.

An audio codec 22 connected to the processor 20 receives an audio signal from a microphone 24 and provides an audio signal to a speaker 26. These components can be to record and playback an audio track, along with a video sequence or still image. If the digital camera 10 is a multi-function device such as a combination camera and mobile phone, the microphone 24 and the speaker 26 can be used for telephone conversation.

In some embodiments, the speaker 26 can be used as part of the user interface, for example to provide various audible signals which indicate that a user control has been depressed, or that a particular mode has been selected. In some embodiments, the microphone 24, the audio codec 22, and the processor 20 can be used to provide voice recognition, so that the user can provide a user input to the processor 20 by using voice commands, rather than user controls 34. The speaker 26 can also be used to inform the user of an incoming phone call. This can be done using a standard ring tone stored in firmware memory 28, or by using a custom ring-tone downloaded from a wireless network 58 and stored in the image memory 30. In addition, a vibration device (not shown) can be used to provide a silent (e.g., non audible) notification of an incoming phone call.

The processor 20 also typically provides additional processing of the image data from the image sensor 14, in order to produce rendered sRGB image data which is compressed and stored within a "finished" image file, such as a well-known Exif-JPEG image file, in the image memory 30. In some embodiments, the processor is used to store image data to a "raw" file in the image memory.

The digital camera 10 can be connected via the wired interface 38 to an interface/recharger 48, which is connected to a computer 40, which can be a desktop computer or portable computer located in a home or office. The wired interface 38 can conform to, for example, the well-known USB 2.0 interface specification. The interface/recharger 48 can provide power via the wired interface 38 to a rechargeable battery (not shown) in the digital camera 10.

The digital camera 10 can include a wireless modem 50, which interfaces over a radio frequency band 52 with the wireless network 58. The wireless modem 50 can use various wireless interface protocols, such as the well-known Bluetooth wireless interface or the well-known 802.11 wireless interface. The computer 40 can upload images via the Internet 70 to a photo service provider 72, such as the Kodak Gallery. Other devices (not shown) can access the images stored by the photo service provider 72. The wireless network 58 can also communicate directly with the internet 70 or photo service provider 72 without requiring a computer 40 (links not shown).

In alternative embodiments, the wireless modem 50 communicates over a radio frequency (e.g. wireless) link with a mobile phone network (not shown), such as a 3GSM network, which connects with the Internet 70 in order to upload digital image files from the digital camera 10. These digital image files can be provided to the computer 40 or the photo service provider 72.

Figure 4:
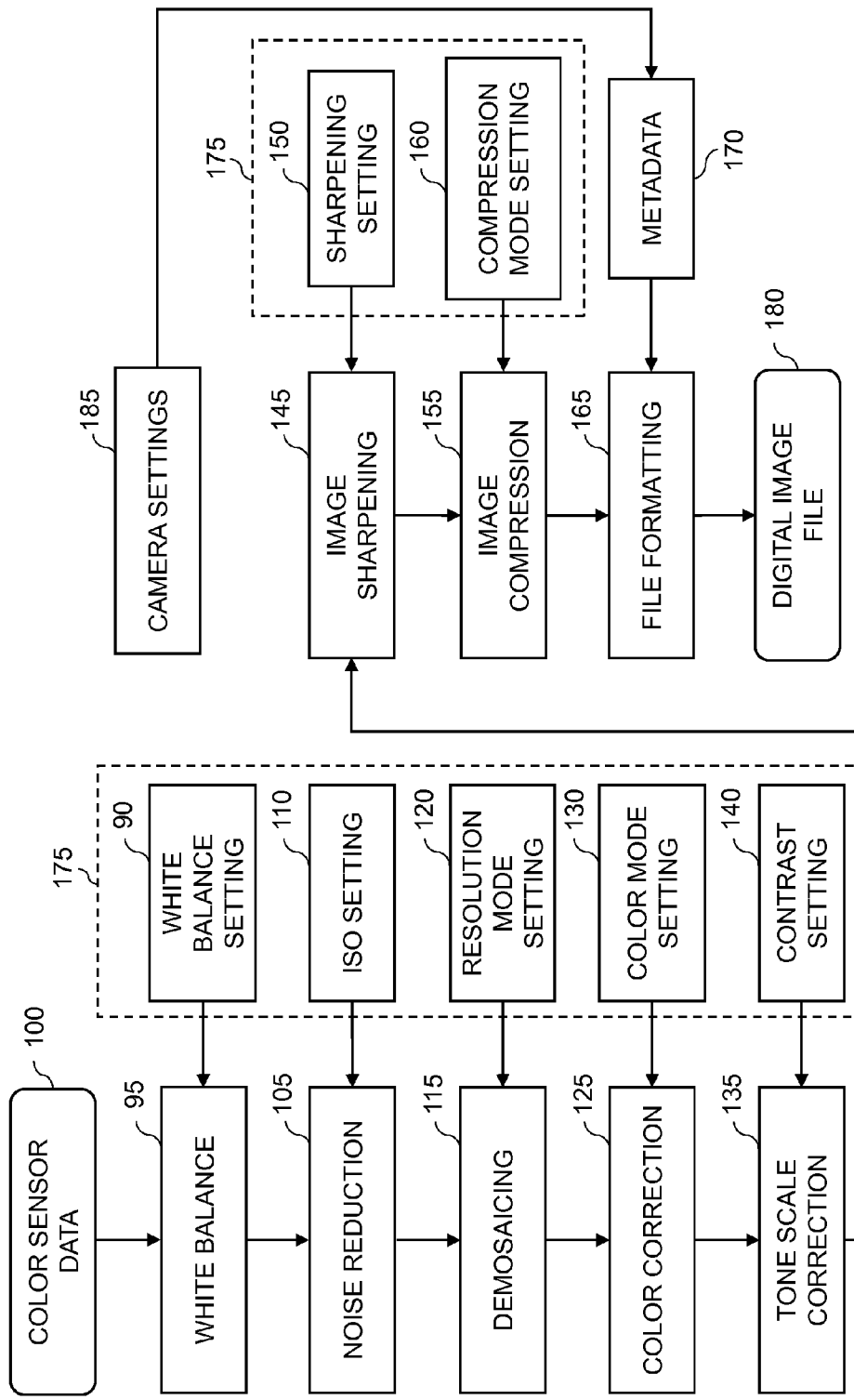
FIG. 4 is a flow diagram depicting typical image processing operations used to process digital images in a digital camera.

FIG. 4 is a flow diagram depicting image processing operations that can be performed by the processor 20 in the digital camera 10 (FIG. 3) in order to process color sensor data 100 from the image sensor 14 output by the ASP and A/D converter 16. In some embodiments, the processing parameters used by the processor 20 to manipulate the color sensor data 100 for a particular digital image are determined by various user settings 175, which can be selected via the user controls 34 in response to menus displayed on the image display 32.

The color sensor data 100 which has been digitally converted by the ASP and A/D converter 16 is manipulated by a white balance step 95. In some embodiments, this processing can be performed using the methods described in commonly-assigned U.S. Pat. No. 7,542,077 to Mild, entitled "White balance adjustment device and color identification device," the disclosure of which is herein incorporated by reference. The white balance can be adjusted in response to a white balance setting 90, which can be manually set by a user, or which can be automatically set by the camera.

The color image data is then manipulated by a noise reduction step 105 in order to reduce noise from the image sensor 14. In some embodiments, this processing can be performed using the methods described in commonly-assigned U.S. Pat. No. 6,934,056 to Gindele et al., entitled "Noise cleaning and interpolating sparsely populated color digital image using a variable noise cleaning kernel," the disclosure of which is herein incorporated by reference. The level of noise reduction can be adjusted in response to an ISO setting 110, so that more filtering is performed at higher ISO exposure index setting.

The color image data is then manipulated by a demosaicing step 115, in order to provide red, green and blue (RGB) image data values at each pixel location. Algorithms for performing the demosaicing step 115 are commonly known as color filter array (CFA) interpolation algorithms or "deBayering" algorithms. In one embodiment of the present invention, the demosaicing step 115 can use the luminance CFA interpolation method described in commonly-assigned U.S. Pat. No. 5,652,621 to Adams et al., entitled "Adaptive color plane interpolation in single sensor color electronic camera," the disclosure of which is incorporated herein by reference. The demosaicing step 115 can also use the chrominance CFA interpolation method described in commonly-assigned U.S. Pat. No. 4,642,678 to Cok, entitled "Signal processing method and apparatus for producing interpolated chrominance values in a sampled color image signal," the disclosure of which is herein incorporated by reference.

In some embodiments, the user can select between different pixel resolution modes, so that the digital camera can produce a smaller size image file. Multiple pixel resolutions can be provided as described in commonly-assigned U.S. Pat. No. 5,493,335 to Parulski et al., entitled "Single sensor color camera with user selectable image record size," the disclosure of which is herein incorporated by reference. In some embodiments, a resolution mode setting 120 can be selected by the user to be full size (e.g. 3,000×2,000 pixels), medium size (e.g. 1,500×1000 pixels) or small size (750×500 pixels).

The color image data is color corrected in color correction step 125. In some embodiments, the color correction is provided using a 3×3 linear space color correction matrix, as described in commonly-assigned U.S. Pat. No. 5,189,511 to Parulski, et al., entitled "Method and apparatus for improving the color rendition of hardcopy images from electronic cameras," the disclosure of which is incorporated herein by reference. In some embodiments, different user-selectable color modes can be provided by storing different color matrix coefficients in firmware memory 28 of the digital camera 10. For example, four different color modes can be provided, so that the color mode setting 130 is used to select one of the following color correction matrices:

Setting 1 (normal color reproduction)

$$\begin{bmatrix} R_{out} \\ G_{out} \\ B_{out} \end{bmatrix} = \begin{bmatrix} 1.50 & -0.30 & -0.20 \\ -0.40 & 1.80 & -0.40 \\ -0.20 & -0.20 & 1.40 \end{bmatrix} \begin{bmatrix} R_{in} \\ G_{in} \\ B_{in} \end{bmatrix} \quad (1)$$

Setting 2 (saturated color reproduction)

$$\begin{bmatrix} R_{out} \\ G_{out} \\ B_{out} \end{bmatrix} = \begin{bmatrix} 2.00 & -0.60 & -0.40 \\ -0.80 & 2.60 & -0.80 \\ -0.40 & -0.40 & 1.80 \end{bmatrix} \begin{bmatrix} R_{in} \\ G_{in} \\ B_{in} \end{bmatrix} \quad (2)$$

Setting 3 (de-saturated color reproduction)

$$\begin{bmatrix} R_{out} \\ G_{out} \\ B_{out} \end{bmatrix} = \begin{bmatrix} 1.25 & -0.15 & -0.10 \\ -0.20 & 1.40 & -0.20 \\ -0.10 & -0.10 & 1.20 \end{bmatrix} \begin{bmatrix} R_{in} \\ G_{in} \\ B_{in} \end{bmatrix} \quad (3)$$

Setting 4 (monochrome)

$$\begin{bmatrix} R_{out} \\ G_{out} \\ B_{out} \end{bmatrix} = \begin{bmatrix} 0.30 & 0.60 & 0.10 \\ 0.30 & 0.60 & 0.10 \\ 0.30 & 0.60 & 0.10 \end{bmatrix} \begin{bmatrix} R_{in} \\ G_{in} \\ B_{in} \end{bmatrix} \quad (4)$$

In other embodiments, a three-dimensional lookup table can be used to perform the color correction step 125.

The color image data is also manipulated by a tone scale correction step 135. In some embodiments, the tone scale correction step 135 can be performed using a one-dimensional look-up table as described in U.S. Pat. No. 5,189,511, cited earlier. In some embodiments, a plurality of tone scale correction look-up tables is stored in the firmware memory 28 in the digital camera 10. These can include look-up tables which provide a "normal" tone scale correction curve, a "high contrast" tone scale correction curve, and a "low contrast" tone scale correction curve. A user selected contrast setting 140 is used by the processor 20 to determine which of the tone scale correction look-up tables to use when performing the tone scale correction step 135. The plurality of tone curves can include curves meant to adjust for exposure gain factors as well, avoiding use of a digital gain elsewhere in the processing chain.

The color image data is also manipulated by an image sharpening step 145. In some embodiments, this can be provided using the methods described in commonly-assigned U.S. Pat. No. 6,192,162 to Hamilton, et al., entitled "Edge enhancing colored digital images," the disclosure of which is incorporated herein by reference. In some embodiments, the user can select between various sharpening settings, including a "normal sharpness" setting, a "high sharpness" setting, and a "low sharpness" setting. In this example, the processor 20 uses one of three different edge boost multiplier values, for example 2.0 for "high sharpness", 1.0 for "normal sharpness", and 0.5 for "low sharpness" levels, responsive to a sharpening setting 150 selected by the user of the digital camera 10.

The color image data is also manipulated by an image compression step 155. In some embodiments, the image compression step 155 can be provided using the methods described in commonly-assigned U.S. Pat. No. 4,774,574 to Daly et al., entitled "Adaptive block transform image coding method and apparatus," the disclosure of which is incorporated herein by reference. In some embodiments, the user can select between various compression settings. This can be implemented by storing a plurality of quantization tables, for example, three different tables, in the firmware memory 28 of the digital camera 10. These tables provide different quality levels and average file sizes for the compressed digital image file 180 to be stored in the image memory 30 of the digital camera 10. A user selected compression mode setting 160 is used by the processor 20 to select the particular quantization table to be used for the image compression step 155 for a particular image.

The compressed color image data is stored in a digital image file 180 using a file formatting step 165. The image file can include various metadata 170. Metadata 170 is any type of information that relates to the digital image, such as the model of the camera that captured the image, the size of the image, the date and time the image was captured, and various camera settings, such as the lens focal length, the exposure time and f-number of the lens, and whether or not the camera flash fired. In a preferred embodiment, all of this metadata 170 is stored using standardized tags within the well-known Exif-JPEG still image file format. In a preferred embodiment of the present invention, the metadata 170 includes information about camera settings 185.

The present invention blends use of ambient illumination and flash illumination to improve overall image quality for a specific scene, responsive to scene brightness and scene motion. When the processor 20 selects capture settings for a particular scene, such as exposure index, lens aperture setting and exposure time, there are tradeoffs in image quality that must be considered when scene motion is present. Exposure index (EI) relates to the amount of light collected on the sensor for an image capture. ISO relates to the signal (in terms of pixel values) produced by an image sensor in response to a given amount of light and the associated analog or digital gain that is applied to the pixel values when an image is captured as is well known to those skilled in the art.

Typically, ISO is selected to match the EI used in exposure calculations. Typically the selection of ISO is also complemented by further selections of image processing parameters including gain and various noise reduction image processing choices where higher ISO is accompanied by greater levels of noise reduction image processing. A long exposure time increases the signal-to-noise ratio so the resulting image looks bright with low noise, but motion that is present then results in more motion blur in the image. In this case, any local motion that is present results in locally blurred areas such as when a fast moving car enters the scene; in addition, global motion can occur, such as when the image capture device is moved during image capture, which will result in the entire image being blurred.

Shortening the exposure time decreases motion blur, but the signal-to-noise ratio is also decreased so that the resulting image will look dark or noisy. As the lighting conditions in the scene become darker, longer exposure times are required to produce an image with an acceptable signal-to-noise ratio that is suitably bright and not noisy. Increasing the gain for an image capture increases the brightness of the image but the noise is made more apparent as well. The important point to note is that the tradeoff of motion blur and noise in an image is a matter of perception.

The invention described herein provides a method for capturing an archival image with an image capture device and automatically selecting camera settings (e.g., EI and exposure time settings) for an image capture device based on measured scene brightness and measured motion velocity in the scene in the form of a signal ratio, the method being implemented at least partially with a data processing system. In a first embodiment, the invention comprises using an image capture device with selectable capture modes, EI, and exposure time for capturing at least two preview images of a scene. The preview images are analyzed to determine a scene brightness and motion velocity in the scene. A signal ratio is then determined between the scene brightness and motion velocity, and is used in the process of determining appropriate camera settings.

In order to determine exposure time when considering motion blur and EI, the relationship between motion blur and EI must be understood. A common form of exposure metering equation uses the following relation between exposure time and EI:

$$t = \frac{C \times N^2}{H} \times \frac{1}{EI} \quad (5)$$

Where H is the scene brightness or luminance (in units such as $cd/m^2$), C is a metering constant, N is the f-number, t is the exposure time (seconds), and EI is the exposure index of the capture. Given a fixed illumination level and a fixed aperture, exposure time and EI are inversely related. For example, halving the exposure time will double the EI of the capture.

Based on a constant linear model of motion, the motion blur obtained during a capture is:

$$b = t \times V \quad (6)$$

Where V is the apparent motion velocity (pixels/second), and b is pixels of motion blur (pixels of displacement during exposure).

In Eqs. (5) and (6), V and H are imposed by the scene, N is normally at its minimum value when motion blur and image noise are a concern, and t is chosen by the camera control algorithm. Taking the logarithm of these equations allows these relationships to be considered in log space, where product and inverse relationships can be represented with straight lines.

$$\log_2(t) = \log_2(C) + 2\log_2(N) - \log_2(H) - \log_2(EI) \quad (7)$$

$$\log_2(b) = \log_2(t) + \log_2(V) \quad (8)$$

Figure 5A:
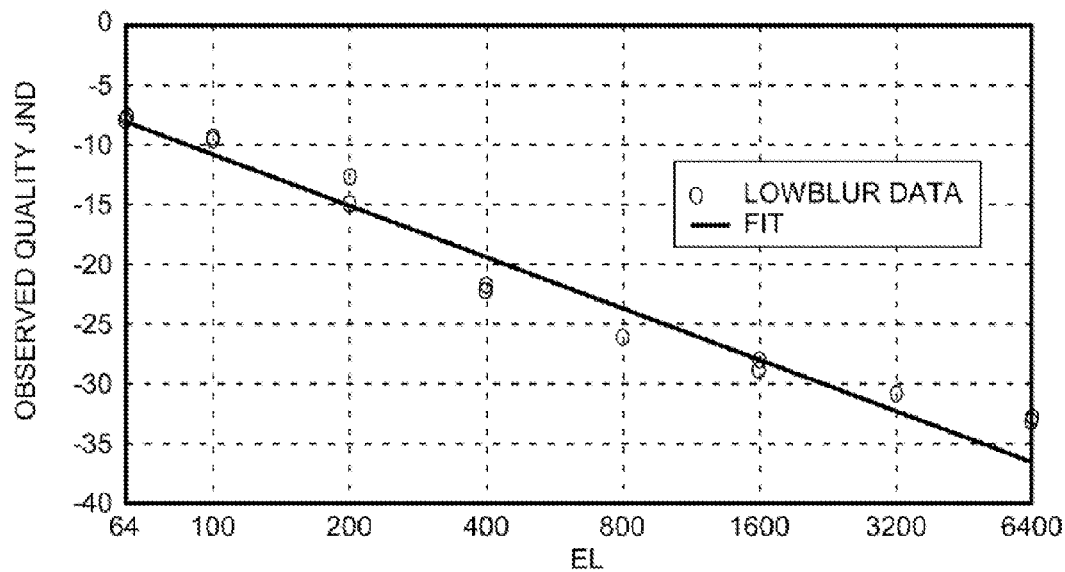
FIG. 5A is a graph showing the relationship between exposure index and the perceived image quality for a low blur image.
Figure 5B:
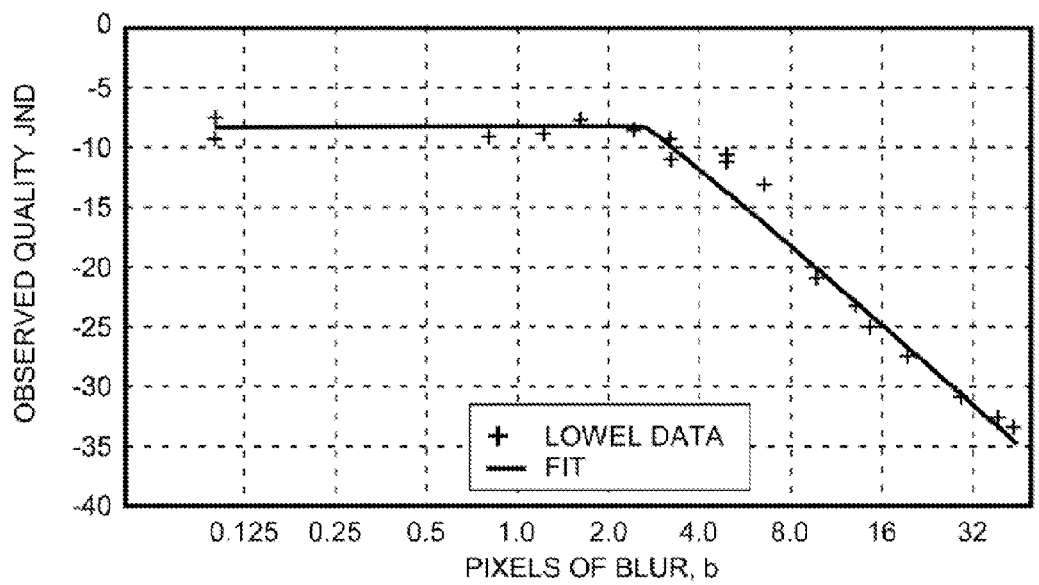
FIG. 5B is a graph showing the relationship between the amount of blur in an image and the perceived image quality for a low exposure index image.
Figure 5C:
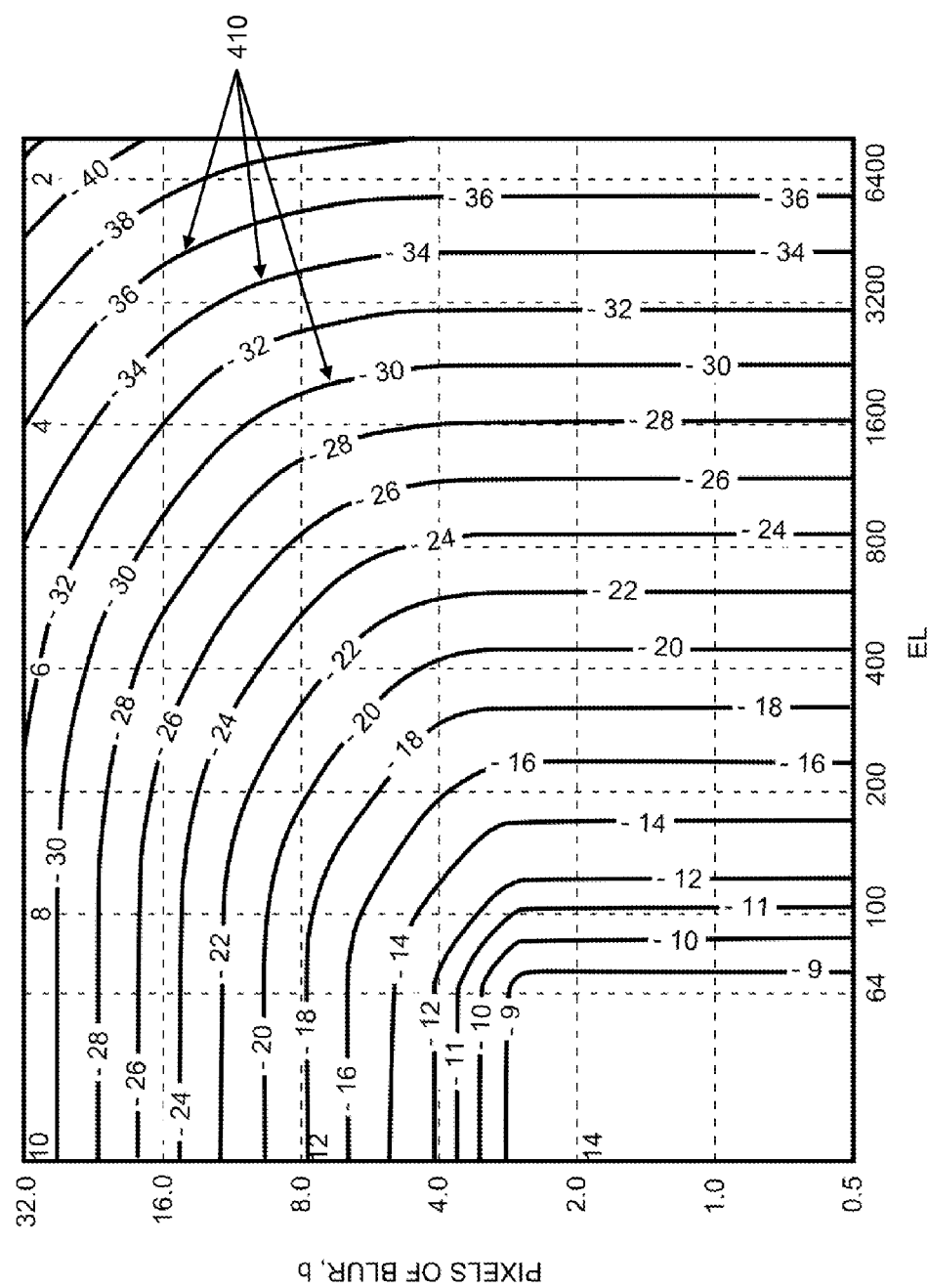
FIG. 5C is a graph depicting the variation in perceived image quality as a function of exposure index and motion blur.

In a preferred embodiment, psychometric data for image quality are used to control exposure settings in the presence of motion. FIGS. 5A, 5B and 5C present data from psychometric studies of image quality, for a large number of images captured with a specific digital camera, as observed by a group of twenty observers and rated for perceived image quality in terms of Just Noticeable Difference units (JNDs). JNDs are commonly used in digital imaging to describe changes in perceived image quality. A description of JNDs can be found in the article entitled "ISO 20462, A psychophysical image quality measurement standard," by Keelan et al.: (Image Quality and System Performance, Proc. of SPIE-IS&T Electronic Imaging, Vol. 5294, pp. 181-189, 2004). JND units are statistically discernible levels of difference, where a single JND is the smallest quality difference that is consistently detectable by the observers. In the multi-dimensional model that is presented in FIG. 5C, quality is expressed in JND units, as compared to an image that is perceived to be of excellent image quality which has a JND level of zero. The quality values shown in the data of FIGS. 5A-5C are essentially JND units of image quality degradation from a high quality reference level. JNDs can be defined for a variety of image quality traits including blur and noise.

FIGS. 5A and 5B show the average image quality as perceived by a group of 20 observers for a large number of image renditions of the same scene that were captured with controlled amounts of image noise and blur produced by different EI (or ISO) settings and controlled global motion blur respectively. Image noise corresponds to unwanted random variations in the image level originating from random processes affecting the image sensing and processing operations. FIG. 5A shows the data for a series of low blur images with varying amounts of noise as produced by capturing the same scene with different EI settings on the digital camera. As can be seen from this data, perceived image quality progressively gets worse as EI is increased.

FIG. 5B shows the data for a series of images captured with a low EI setting and various amounts of blur produced by controlled motion of the camera during the exposure time. Motion blur is the amount of blur in the captured image as described by the product of the pixel velocity V and the exposure time t, as in Eq. (6). The data shows that blur does not have any effect on perceived image quality until it gets above a certain threshold blur level (about 2-3 pixels of blur).

Those skilled in the art will appreciate the quality data shown in FIGS. 5A and 5B specifically apply to the viewing conditions used for the psychometric experiment (e.g., an LCD display at approximately 100 pixels per inch, a 20 inch viewing distance, and a dim surround), and the curves will change with changes in viewing conditions. Because detailed knowledge of viewing conditions is usually not available at time of capture, the image capture and processing chain is normally optimized for a representative viewing condition.

FIG. 5C shows a contour plot of overall image quality as a function of IE and motion blur, effectively combining the two models from FIGS. 5A and 5B. Contour lines 410 depict contours of constant overall image quality. FIG. 5A is effectively a plot of this quality model along the horizontal or EI axis, while FIG. 5B is effectively a plot along the vertical, or pixels of motion blur, axis. FIG. 5C shows clearly that image capture with low amounts of motion blur and low EI provides the best image quality possible with this camera. As either EI or pixels of motion blur is increased, overall quality is reduced. The contour lines 410 of constant image quality tend to be vertical when motion blur is low and horizontal when motion blur is high. This indicates that at low levels of motion blur, motion blur is not very noticeable while noise associated with increasing EI is very noticeable, so that lines of constant perceived image quality are vertical. In this low blur region of the graph, it is important to use a longer exposure time with a lower EI setting to reduce noise while allowing some blur (note that EI cannot be reduced below the base EI of the image sensor, which is 64 in this case). In contrast, at high levels of motion blur where constant JND lines are horizontal, motion blur is very noticeable compared to image noise. In this high blur region of the graph, it is important to use a shorter exposure time with a higher EI setting to reduce blur while allowing some noise.

Figure 6:
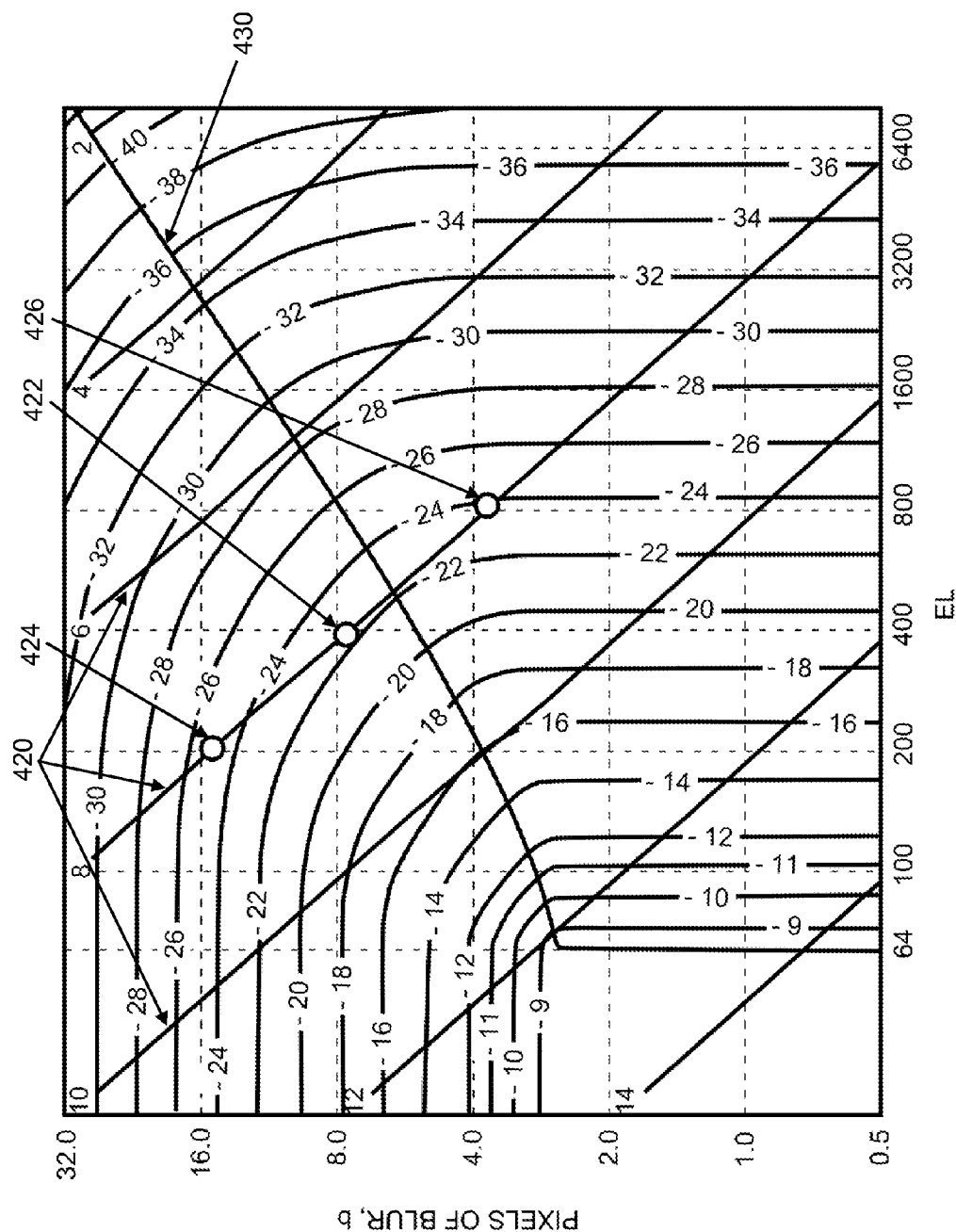
FIG. 6 is a graph depicting the variation in perceived image quality as a function of exposure index and motion blur with added features illustrating the determination of preferred image capture conditions.

FIG. 6 contains the same quality model contours as FIG. 5C and also includes angled lines of constant log signal ratio 420. As mentioned previously, the signal ratio is a ratio between a determined scene brightness and a determined motion velocity, and log signal ratio is simply the log of this signal ratio. In a preferred embodiment, the signal ratio is defined to be HR/V so that the log signal ratio (S) is given as:

$$S = \log_2\left(\frac{H \times R}{V}\right) = \log_2(H) + \log_2(R) - \log_2(V) \quad (9)$$

In this equation, H is the scene illuminance (typically in units of cd/m²), which is a measure of the scene brightness, V is the motion velocity (typically in pixels/second), and R is a constant. In a preferred embodiment, R is set to be the number of photo-electrons captured in a pixel per lux-second of exposure. This value can be determined based on the f-number of the lens, the spectral quantum efficiency of the sensor, the scene illuminant, and a presumed scene reflectance. In practice, the constant R scales the scene illuminance data to give convenient values for the range of S. The specific value of R is relatively unimportant, and it can be adjusted as a matter of tuning, rather than performing detailed spectral calculations. For one example camera, R has the value 440. Because scene brightness is a product of scene illuminance (the amount of light falling on the scene) and scene reflectance, scene luminance (the amount of light reflected from the scene) can be used rather than scene illuminance with an appropriate change in R.

Lines of constant log signal ratio 420 represent the quality tradeoff positions available by capturing an image at different EI values for a given log signal ratio. Each line of constant log signal ratio 420 is labeled with its respective log signal ratio value at the left and top of the line. One significant implication of this figure is that overall image quality does not depend on scene brightness alone, nor does it depend on motion velocity alone; it depends on both of these values together. Changes in exposure time (or equivalently EI) move an image capture along one of these lines, while changes in the signal ratio change which line of constant log signal ratio 420 the camera will operate along for exposure control purposes.

For example, if scene brightness and motion velocity are such that the log signal ratio is 8, then the scene can be captured with an EI of approximately 400 and 8 pixels of motion blur as shown by capture setting point 422. The exposure time required to do this will depend on the specific scene brightness and motion velocity, but as long as the log signal ratio is 8, the scene will fall onto this line of constant log signal ratio. If the exposure time is doubled relative to the exposure time that yields an EI of 400, then the EI will be halved to 200. The doubled exposure time will also double the amount of motion blur, to roughly 16 pixels as shown by capture setting point 424. Conversely, if the exposure time is halved instead of doubled, then the EI is doubled to 800, and the motion blur is halved to 4 as shown by capture setting point 426. All three of these conditions fall along the single line of constant log signal ratio.

Continuing this example, the quality contours show the image quality obtained in a capture at EI 400 and 8 pixels of motion blur is slightly lower than would be obtained with an EI of approximately 470, which will correspond to slightly less motion blur. If the exposure time is decreased further (increasing EI and decreasing blur), image quality will begin to degrade. For a log signal ratio of 8, the EI yielding the best image quality is approximately 470. This analysis can be carried out for very many values of log signal ratio, finding the location on each line providing the best image quality. Preferred exposure curve 430 in FIG. 6 shows the preferred combination of EI and motion blur for every log signal ratio.

For real-time decisions within an image capture device, the full quality surface shown in FIG. 6 by the contours of constant quality is superfluous. The most important relationship in the figure is preferred exposure curve 430. Examining FIG. 6, it can be seen that for a specified log signal ratio, the best image quality is obtained by capturing an image with an EI near preferred exposure curve 430. As the exposure time is changed to move away from preferred exposure curve 430, image quality decreases. The selection of EI, and ultimately exposure time values, are determined by the preferred exposure curve 430 in FIG. 6 to obtain the best perceived image quality throughout the space shown. Preferred exposure curve 430 can effectively be represented by a function relating pixels of blur to EI, for example with a fit as shown in the following equation:

$$B = -0.0004433 I^3 + 0.14731 I^2 - 1.0307 I + 8.187 \quad (10)$$

where $$I = \log_2(EI) \quad (11)$$

$$B = \log_2(b) + 5 \quad (12)$$

Note that the simple polynomial of Eq. (10) does not capture the discontinuity at EI=64, when preferred exposure curve 430 becomes vertical due to the fact that this is the minimum EI at which the digital image capture device can be operated. In the present invention, the vertical portion of the curve is unimportant for exposure control. If the scene conditions provide a very high signal ratio, so that capture at the lowest exposure index possible is indicated, then motion blur is not a problem, and use of flash to gain added light will not be necessary.

Figure 7:
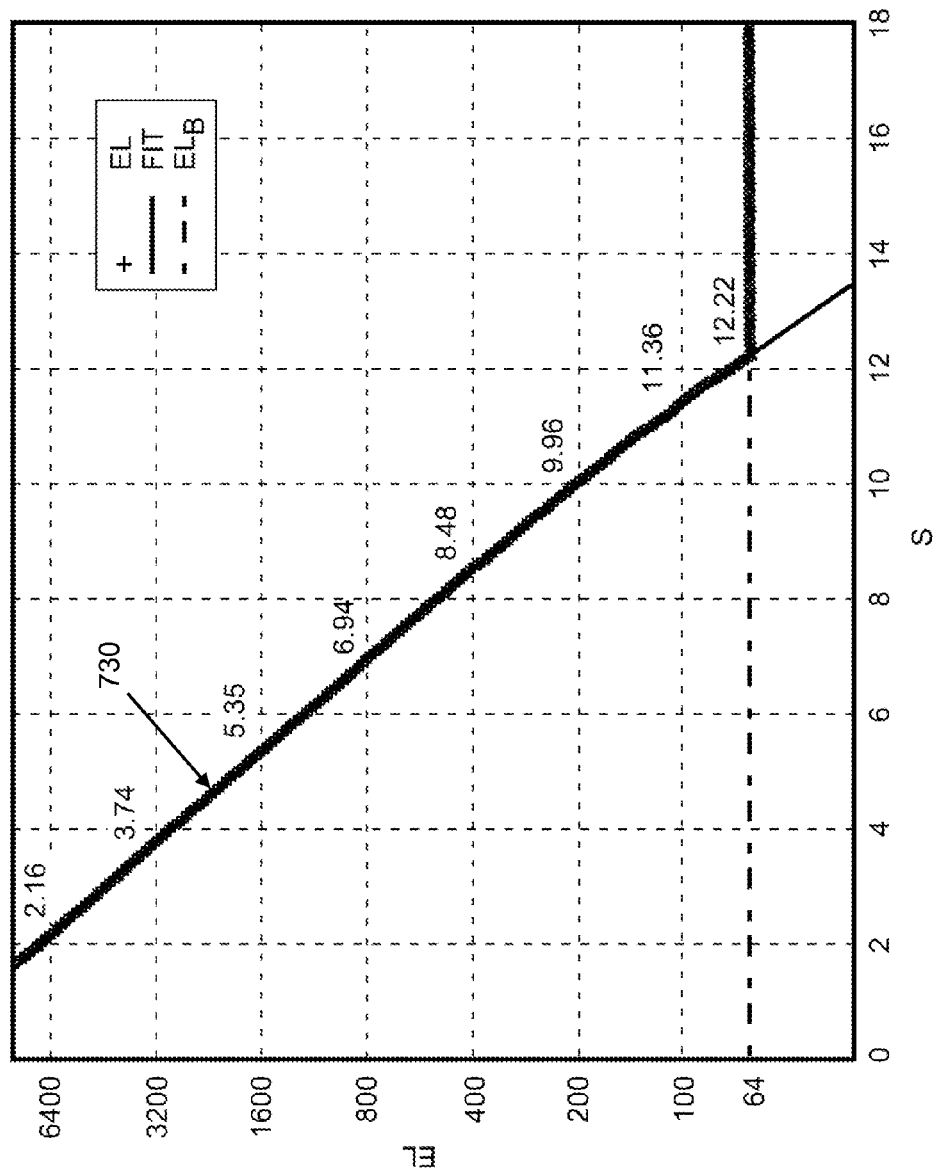
FIG. 7 is a diagram depicting preferred exposure index as a function of a signal ratio is then determined between the scene brightness and motion velocity.

FIG. 7 shows a curve 730 giving the relationship between log signal ratio (S) and exposure index (EI) needed to obtain the best perceived image quality using the digital camera that was used in this study in a full resolution capture mode. In FIG. 7, the horizontal axis is log signal ratio (S) and the vertical axis is the exposure index (EI). As indicated by the curve 730, as the signal ratio increases (scene is brighter relative to the motion velocity), the EI should be reduced for improved perceived image quality. The relationship of using lower EI for brighter scenes is commonly used in the operating systems of digital cameras. However, since the horizontal axis in FIG. 7 is based on a ratio of the scene brightness to the motion velocity, the curve 730 also indicates that as the motion velocity V increases (more motion), and consequently S decreases, the EI should be increased correspondingly. The curve 730 can be expressed in equation form as:

$$EI = \max(64, 2^I) \quad (13)$$

where $$I = -0.000445 S^3 + 0.00526 S^2 - 0.6855 S + 14.872 \quad (14)$$

Those skilled in the art will recognize that EI can only be reduced down to the base ISO (or saturation-limited ISO) of the image sensor ($EI_B$), which for the case of the data shown in FIG. 7 is 64. As a result, the curve 730 shown in FIG. 7 abruptly changes to a horizontal line at EI=64, consistent with Eq. (13).

The relationship between EI and blur for lines of constant log signal ratio 420 in FIG. 6 holds true for ambient illumination, when the light captured is proportional to exposure time, and EI is inversely proportional with exposure time. When flash is used, it has the effect of adding exposure to the capture, without increasing exposure time or increasing motion blur, as long as the exposure time is long enough to synchronize image capture with the flash.

In cases where a flash is used to supplement the ambient lighting, a flash exposure setting is generally determined as a function of the subject distance (i.e., the distance between the camera and the subject being photographed). In some embodiments, subject distance information, to be used in flash exposure calculations, is obtained by detecting the stepper motor counts on the camera lens autofocus driving mechanism. These stepper motor counts can be directly mapped to lens focus position and associated subject distance using a table of focal length and associated lens position data stored in camera firmware or software. The lens focus position can be determined by various techniques including manual focus techniques, contrast maximization or phase detection autofocus techniques. In other embodiments, subject distance information can be obtained using well-known techniques such as active infrared distance triangulation, or pre-flash energy return monitoring.

The exposure added to the image from flash use starts with a conventional flash exposure equation:

$$N = \frac{G}{D} \quad (15)$$

where N is the lens aperture (f-number), G is the flash guide number, and D is the subject distance. This equation is normally used to solve for f-number, given a guide number and a subject distance.

The flash guide number G depends on EI and available flash power. The guide number of a flash is normally stated for ISO 100. The flash guide number for a general EI can be determined according to the following equation:

$$G = G_{100} \sqrt{\frac{EI}{100}} \quad (16)$$

Combining these two relationships produces Eq. (17), which solves for the EI which will provide a normally exposed capture, based on the flash base guide number and the subject distance.

$$EI_F = \left(\frac{ND}{G_{100}}\right)^2 \quad (17)$$

The final fundamental relationship is to note how the ambient and flash exposures add. The model used here is that the signal acquired from the flash exposure adds with the ambient exposure. Since exposure is inversely related to EI, the total exposure index $EI_t$ is the reciprocal of the sum of the reciprocals:

$$EI_T = \left(\frac{1}{EI_A} + \frac{1}{EI_F}\right)^{-1} \quad (18)$$

Figure 8:
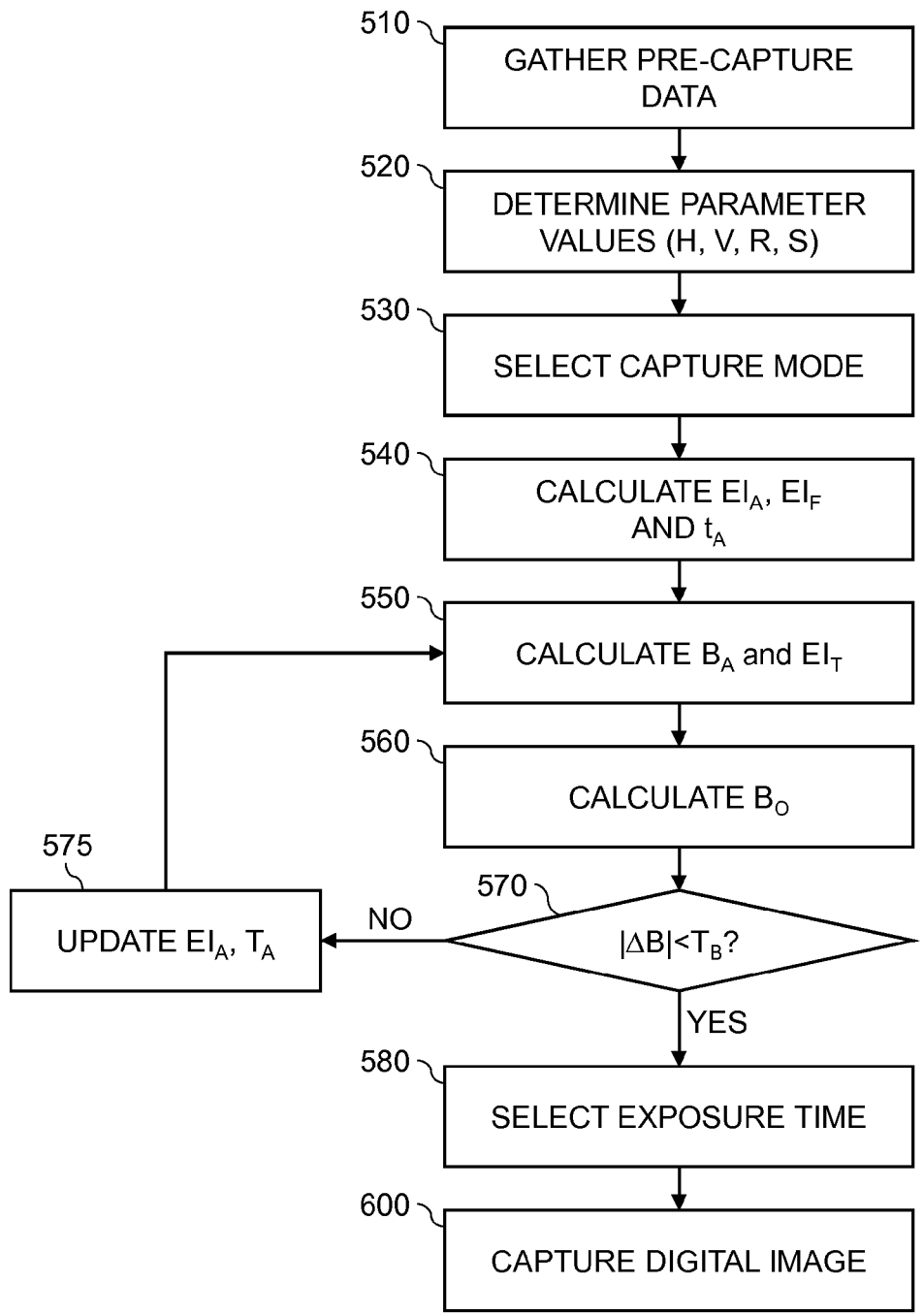
FIG. 8 is a flowchart depicting a method for determining flash and ambient exposure settings according to an embodiment of the present invention.

Given these relationships, a process for including flash exposure and ambient exposure is shown by the flow chart of FIG. 8. In gather pre-capture data step 510, pre-capture data is gathered from a series of preview images and other data sources available in the camera. In a preferred embodiment, the pre-capture data includes at least two preview images of the scene captured at different times to enable the estimation of motion velocity. Typically, the preview images are captured without using the flash 2. However in some embodiments, at least some of the preview images can be captured using the flash.

In determine parameter values step 520, this pre-capture data is used to estimate scene brightness (H), motion velocity (V), and subject distance (D). The scene brightness can be determined by analyzing the signal level in a captured preview image, or can be determined responsive to a signal from some other light sensor. In a preferred embodiment, the motion velocity is determined by analyzing a sequence of at least two preview images captured at different capture times. The motion velocity can be estimated by identifying corresponding points and edges in the sequence of preview images using methods well-known in the art. The distance between the corresponding points in the sequence of images can be used to determine the motion velocity given the time interval between the capture times. For the case where there is local motion blur in the scene, the motion velocity of some image regions may be different than the motion velocity for other image regions. In this case, the motion velocity can be determined by various methods such as selecting the maximum local motion velocity, by averaging the local motion velocities, or by determining a motion velocity for a main subject in the image. As discussed earlier, the subject distance can be determined using various methods known in the art such as detecting the stepper motor counts on the camera lens autofocus driving mechanism, using active infrared distance triangulation, phase detection or contrast maximization autofocusing, or pre-flash energy return monitoring. The estimated scene brightness and motion velocity are used, together with the minimum (wide open) f-number, to calculate a log signal ratio (S) using Eq. (9).

In select capture mode step 530, a capture mode is selected based on the log signal ratio. In a preferred embodiment, this is done using the method described in commonly-assigned, co-pending U.S. patent application Ser. No. 12/701,659, which is incorporated herein by reference.

In calculate $EI_A$, $EI_F$ and $t_A$ step 540, an ambient-only exposure index ($EI_A$) is calculated from the log signal ratio (S) using Eqs. (13)-(14). Also, a flash-only exposure index ($EI_F$) is calculated using the subject distance, f-number, and base flash guide number using Eq. (17). Finally, an ambient exposure time ($t_A$) is determined from $EI_A$ and scene brightness by solving Eq. (5) for t.

A calculate $B_A$ and $EI_T$ step 550 is now used to calculate an ambient log motion blur ($B_A$) and a total exposure index ($EI_t$). The ambient motion blur ($b_A$) is determined by substituting the ambient exposure time ($t_A$) and the determined motion velocity (V) into Eq. (6). A corresponding ambient log motion blur ($B_A$) is then calculated using Eq. (12). Further, the total exposure index ($EI_T$) is determined using Eq. (18).

In calculate $B_O$ step 560, a preferred log motion blur ($B_O$) corresponding to $EI_T$ is determined using Eqs. (10)-(11), which represents the preferred relationship of motion blur and exposure index given by preferred exposure curve 430 from FIG. 6. (Note that the coefficients in these equations, and perhaps even the form of the equations, will be different depending on the noise characteristics of the particular digital image capture system.)

In decision test 570, a delta log motion blur (ΔB) is calculated corresponding to the difference between the preferred log motion blur ($B_O$) and the ambient log motion blur ($B_A$) from the current ambient exposure, using Eq. (19):

$$\Delta B = B_O - B_A \quad (19)$$

If the delta log motion blur is small enough, such as |ΔB|<$T_B$, where $T_B$ is a maximum allowable delta log motion blur, then the iteration has converged on a total exposure and motion blur close enough to the preferred exposure curve 430 in FIG. 6. In one embodiment, a preferred value of $T_B$ is 0.1, so that the iteration terminates when the magnitude of the delta log motion blur is less than 0.1. In this case, processing continues with select exposure time step 580, where the exposure time (t) to be used to capture the archival digital image is selected as the current ambient exposure time $t_A$. Capture digital image step 600 is then used to capture the archival digital image having the desired level of motion blur that will produce the best image quality.

If the delta log motion blur (ΔB) is found to be larger than the maximum allowable delta log motion blur in decision test 570, an update $EI_A$ and $t_A$ step 575 is used to determine a new ambient exposure index ($EI_A$) and a new ambient exposure time ($t_A$). The following equations can be used to determine the updated values. First a correction factor (K) is determined using Eq. (20):

$$K = 2^{-\Delta B} \quad (20)$$

This correction factor is then applied to the ambient exposure index ($EI_A$) and the ambient exposure time ($t_A$) to determine updated values ($EI'_A$ and $t'_A$) using Eqs. (21) and (22):

$$EI'_A = K \times EI_A \quad (21)$$

$$t'_A = \frac{t_A}{K} \quad (22)$$

After updating the ambient exposure time and the ambient exposure index, the process returns to the calculate $B_A$ and $EI_T$ step 550 where a new ambient log motion blur ($B_A$) and a new total exposure index ($EI_t$) are determined using the updated ambient exposure time and the updated ambient exposure index. This iterative process continues until the decision test 570 indicates that convergence has been reached.

Figure 9:
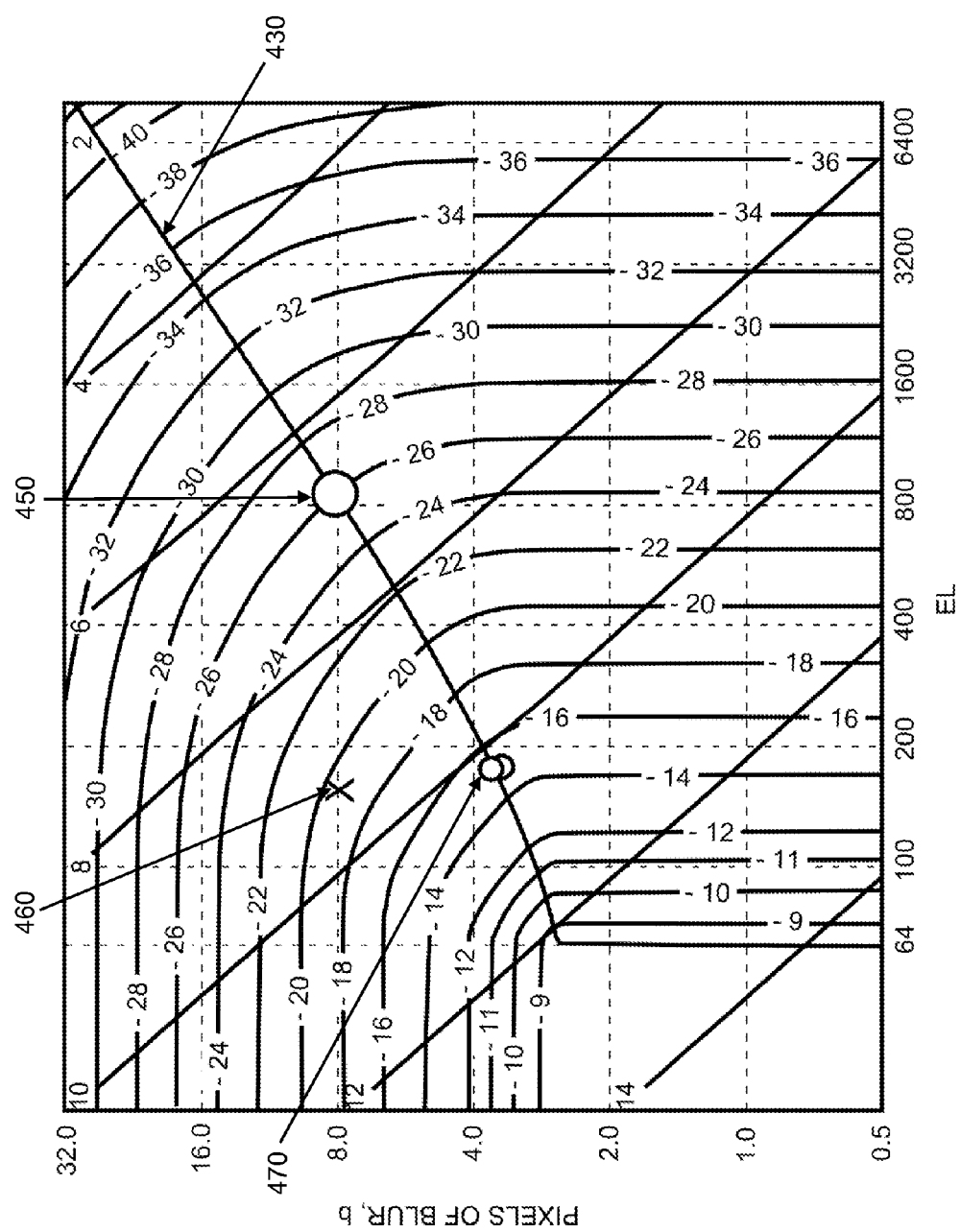
FIG. 9 is a graph illustrating an example of determining flash and ambient exposure settings according to an embodiment of the present invention.

An example of this process is illustrated in FIG. 9, which shows an iteration starting with an $EI_F$ of 200 and an $EI_A$ of 800. The point 450 (shown with a circle symbol), shows where the ambient-only exposure is on the preferred exposure curve 430, with an EI of 800 and motion blur of approximately 8 pixels. Point 460 (shown with a "x" symbol) corresponds to the total exposure index $EI_T$ determined in calculate $B_A$ and $EI_T$ step 550 by combining $EI_F$ and $EI_A$ according to Eq. (17), together with the same level of motion blur as point 450 (~8 pixels). This shows that adding the flash exposure to the initial ambient exposure gives a total exposure corresponding to an EI of 160, with a motion blur of approximately 8 pixels. In this process, addition of flash exposure is presumed to not affect motion blur. This is somewhat conservative, because if the flash exposure is very much greater than the ambient exposure, the motion blur obtained in the ambient exposure may be less noticeable. In other cases, when the flash exposure is closer to the ambient exposure, the motion blur is still clearly perceived. Therefore, this embodiment chooses the conservative model of presuming that motion blur from ambient exposure is the motion blur of concern.

The motion blur of roughly 8 pixels is substantially more motion blur than that indicated for the preferred exposure curve at an EI of 160. Because the preferred motion blur for an EI of 160 is less than the motion blur from the ambient exposure, the ambient exposure time is reduced to bring the ambient exposure motion blur closer to the preferred motion blur. This will increase the ambient exposure index $EI_A$ and thus also the total exposure index $EI_T$. The points 470 (shown with circle symbols) near the preferred exposure curve 430 show successive combinations of motion blur and total exposure index ($EI_T$) as the iterative process of FIG. 8 converges. In this case, preferred conditions of approximately 3.6 pixels of motion blur and an $EI_T$ of 180 result from a preferred blending of ambient and flash exposures. To achieve a blur level of only 3.6 pixels exclusively with ambient light exposure would require an $EI_A$ of approximately 1700, which would result in a significantly noisier (lower quality) image than the inventive process. In this example, combining ambient and flash exposures with optimized gain and shutter time reduces noise and blur to yield an improvement of 10 JNDs of image quality.

In a preferred embodiment, if the ambient-only exposure index determined in the calculate $EI_A$, $EI_F$ and $t_A$ step 540 is below a threshold, such as $EI_A \leq 64$, then no flash is required, and the capture mode is set to an ambient exposure mode, skipping the rest of the process in FIG. 8.

Similarly, if the flash-only exposure index determined in the calculate $EI_A$, $EI_F$ and $t_A$ step 540 is below a threshold, such as $EI_F \leq 64$, then no ambient illumination is required, and the capture mode is set to use only flash exposure, skipping the rest of the process in FIG. 8.

In the embodiment just described, the available flash power was presumed to be fixed, as is typical when operating a camera with a light source operated at full power. One example of this is a flash unit which is always fully charged before use and always fully discharged during use. If the log signal ratio S and subject distance are such that ambient illumination, a short exposure time, and full flash discharge would produce a total $EI_T$ lower than the camera's saturation-limited ISO, then a lower power flash discharge is used. Those skilled in the art will recognize that a flash quench circuit can be used to reduce the flash power used for an image capture.

Figure 10:
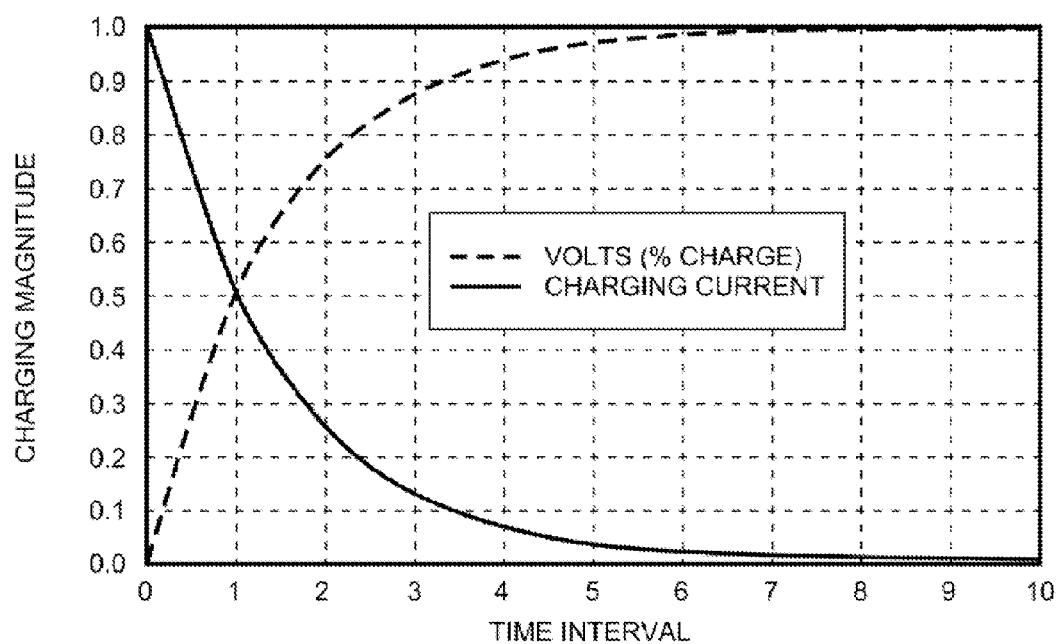
FIG. 10 depicts the exponential charging function for a capacitor in an electronic flash circuit.

In another embodiment the available flash power is a variable, chosen to reduce flash recycle time, or to conserve power and lengthen battery life. FIG. 10 illustrates the well known exponential charging response of a capacitor in an electronic flash circuit. The x-axis denotes uniform intervals of time (e.g., seconds) and the y-axis denotes the relative magnitude of the current applied to the circuit and the resulting voltage. At time zero, if the capacitor is fully discharged from the previous flash emission, the maximum available current is applied to the capacitor. When charging has progressed for one time interval, the voltage has risen to 50% of maximum and the current applied to the capacitor has dropped by 50%. Because the charge available for flash emission is directly proportional to the voltage, this voltage can be monitored as an indication of flash energy available for image exposure. At the 50% charge point, the flash system will provide approximately one-stop less illumination than it would at full charge. In other words, the flash guide number for this instant in time is effectively one-stop ($\sqrt{2}$) less than at full charge. By monitoring the voltage on the charging circuit, the potential flash energy (guide number) at any point during the charging cycle can be applied to the inventive exposure process to provide the most efficient combination of ambient and flash illumination that minimizes unwanted noise and blur and shortens the time interval between photographs. Those skilled in the art will recognize that a flash quench circuit can be used to reduce the flash power used for an image capture even if enough time is available to more fully charge the flash between image captures. This conserves battery power, allowing the camera to operate more consistently for a longer period of time.

In this embodiment with variable flash power, the base guide number used in Eq. (15) is itself a variable. The value of the base guide number can be controlled, with the flash recycle time aiming to provide a limited flash power. The level of flash charge can also be measured during recharge. This allows images to be captured with a preferred combination of ambient illumination and flash use even when the flash is not fully recharged. This is a significant advance over prior art, which either delays image capture until the flash is fully charged, or allows the image to be captured with insufficient exposure, resulting in a dark image. Using the current level of available flash power in exposure control allows adjustment of ISO and exposure time to improve overall image quality.

When the state of flash recharge is being monitored, the available flash power can be represented as a variable base guide number. For example, if the available flash power is half of the fully charged power and the nominal base guide number is 30, then the current base guide number can be scaled as done below:

$$G_C = G_D \sqrt{\frac{P_C}{P_D}} \quad (23)$$

In Eq. (23), $G_D$ is the design base guide number for a fully recharged flash, $P_C$ is the power level for the current state of charge, $P_D$ is the fully charged power level, and $G_C$ is the current base guide number.

Those skilled in the art will recognize that the specific data set presented in FIGS. 5-7 and FIG. 9 and characterized in the multi-dimensional model represented by Eqs. (10)-(14) present a model of a specific digital camera operating in a single capture mode. It is expected that other capture modes and other models of digital cameras or other types of image capture devices will have slightly different data sets along with slightly different multi-dimensional models which are similar to the relationships described previously. In particular, changes to the image sensor 14 and the lens 4 (and optical image stabilization) and associated electronics components and image processing techniques will cause a shift in the relationship between EI and perceived image quality. However, the relationship between motion blur and perceived image quality is broadly applicable. In any case, the method of the invention wherein capture mode, exposure time and EI are selected based on motion velocity and scene brightness (or signal ratio) is broadly applicable to digital image capture devices.

The invention has been described in detail with particular reference to certain preferred embodiments thereof, but it will be understood that variations and modifications can be effected within the spirit and scope of the invention.

| PARTS LIST | |
|---|---|
| 2 | flash |
| 3 | flash sensor |
| 4 | lens |
| 6 | adjustable aperture and adjustable shutter |
| 8 | zoom and focus motor drivers |
| 10 | digital camera |
| 12 | timing generator |
| 14 | image sensor |
| 16 | ASP and A/D Converter |
| 18 | buffer memory |
| 20 | processor |
| 22 | audio codec |
| 24 | microphone |
| 26 | speaker |
| 28 | firmware memory |
| 30 | image memory |
| 32 | image display |
| 34 | user controls |
| 35 | power control |
| 36 | display memory |
| 38 | wired interface |
| 40 | computer |
| 44 | video interface |
| 46 | video display |

-continued

PARTS LIST

| | |
|---|---|
| 48 | interface/recharger |
| 50 | wireless modem |
| 52 | radio frequency band |
| 58 | wireless network |
| 70 | Internet |
| 72 | photo service provider |
| 90 | white balance setting |
| 95 | white balance step |
| 100 | color sensor data |
| 105 | noise reduction step |
| 110 | ISO setting |
| 115 | demosaicing step |
| 120 | resolution mode setting |
| 125 | color correction step |
| 130 | color mode setting |
| 135 | tone scale correction step |
| 140 | contrast setting |
| 145 | image sharpening step |
| 150 | sharpening setting |
| 155 | image compression step |
| 160 | compression mode setting |
| 165 | file formatting step |
| 170 | metadata |
| 175 | user settings |
| 180 | digital image file |
| 185 | camera settings |
| 200 | exposure control system |
| 210 | assess scene brightness step |
| 220 | determine capture mode step |
| 225 | capture mode setting |
| 230 | determine exposure index step |
| 235 | exposure index setting |
| 240 | determine aperture step |
| 245 | aperture setting |
| 250 | determine exposure time step |
| 255 | exposure time setting |
| 260 | capture digital image step |
| 265 | digital image |
| 270 | capture first image step |
| 272 | capture additional image step |
| 275 | analyze image for deficienies step |
| 280 | remaining deficiencies test |
| 282 | update exposure parameters step |
| 285 | combine captured images step |
| 410 | contour lines |
| 420 | lines of constant log signal ratio |
| 422 | capture setting point |
| 424 | capture setting point |
| 426 | capture setting point |
| 430 | preferred exposure curve |
| 450 | point |
| 460 | point |
| 470 | points |
| 510 | gather pre-capture data step |
| 520 | determine parameter values step |
| 530 | select capture mode step |
| 540 | calculate $EI_A$, $EI_F$ and $t_A$ step |
| 550 | calculate $B_A$ and $EI_T$ step |
| 560 | calculate $B_O$ step |
| 570 | decision test |
| 575 | update $EI_A$ and $t_A$ step |
| 580 | select exposure time step |
| 600 | capture digital image step |
| 730 | curve |

The invention claimed is:

1. A method for capturing an improved archival image using an electronic image capture device having a flash, comprising:

capturing at least two preview images of a scene at different capture times using the image capture device;
determining a scene brightness;
using a processor to analyze the captured preview images to determine a motion velocity for the scene;
determining a flash exposure setting and an ambient exposure setting responsive to a ratio of the determined scene brightness divided by the determined motion velocity; and
capturing an archival image using the determined flash exposure setting and the determined ambient exposure setting.

2. The method of claim 1 wherein the determination of the ambient exposure setting is responsive to an image quality function, the image quality function providing an estimate of perceived image quality as a function of a total exposure index and a motion blur level, the total exposure index being related to the flash exposure setting and the ambient exposure setting and the motion blur level being related to the determined motion velocity.

3. The method of claim 2 wherein the image quality function accounts for image quality degradations due to motion blur artifacts and image quality degradations due to image noise artifacts.

4. The method of claim 1 further including determining a subject distance for the scene, and wherein the determined flash exposure setting is also responsive to the determined subject distance.

5. The method of claim 1 wherein the flash exposure setting includes a flash power setting.

6. The method of claim 5 wherein the flash is quenched responsive to the flash power setting.

7. The method of claim 1 further including determining a current charge state for the flash, and wherein the determined flash exposure setting is also responsive to the determined charge state.

8. The method of claim 1 wherein the ambient exposure setting includes an exposure time.

9. The method of claim 1 wherein a total exposure index is determined responsive to the flash exposure setting and an ambient exposure setting, and wherein a gain factor is determined responsive to the total exposure index and the gain factor is used to process the captured archival image.

10. The method of claim 9 wherein the gain factor is applied to the captured archival image in an analog signal processing path or a digital signal processing path.

11. The method of claim 1 wherein the flash uses a xenon light source or an LED light source.

12. The method of claim 1 wherein the at least one of the preview images is captured using the flash.

13. A method for capturing an improved archival image using an electronic image capture device having a flash, comprising:

a) determining a scene brightness;
b) determining a subject distance for the scene;
c) capturing at least two preview images of a scene at different capture times using the image capture device;
d) using a processor to analyze the captured preview images to determine a motion velocity for the scene;
e) determining a flash exposure setting, a total exposure index and an exposure time responsive to the determined subject distance and a ratio of the determined scene brightness divided by the determined motion velocity; and
f) capturing an archival image using the determined flash exposure setting, the total exposure index and the exposure time.

14. The method of claim 13 wherein the total exposure index and the exposure time are determined responsive to an image quality function, the image quality function providing an estimate of perceived image quality as a function of the total exposure index and a motion blur level, the motion blur level being related to the determined motion velocity.

15. The method of claim 14 wherein the image quality function accounts for image quality degradations due to motion blur artifacts and image quality degradations due to image noise artifacts.

16. The method of claim 13 wherein a gain factor is determined responsive to the total exposure index and the gain factor is used to process the captured archival image.

17. The method of claim 13 wherein step e) includes:
  i) determining an ambient exposure index for an ambient exposure responsive to the ratio of the determined scene brightness divided by the determined motion velocity;
  ii) determining a flash exposure index for a flash-only exposure responsive to the determined subject distance and a flash power level;
  iii) determining the flash exposure setting, the total exposure index and the exposure time responsive to the ambient exposure index and the flash exposure index.

18. The method of claim 13 wherein step e) includes determining the total exposure index and the exposure time by:
  i) determine a preferred ambient exposure index responsive to the ratio of the determined scene brightness divided by the determined motion velocity assuming that no flash exposure will be used;
  ii) determining a flash exposure index responsive to the determined subject distance and a flash power level;
  iii) determining an intermediate total exposure index by combining the preferred ambient exposure index and the flash exposure index;
  iv) determining an intermediate preferred blur level responsive to the intermediate total exposure index;
  v) updating the preferred ambient exposure index responsive to the intermediate preferred blur level;
  vi) repeating steps iii)-v) until a convergence criterion is satisfied;
  vii) setting the total exposure index to be the final intermediate total exposure index, and determining the exposure time responsive to the final preferred ambient exposure index.

19. The method of claim 18 wherein the preferred ambient exposure index is selected to substantially maximize an image quality function.

20. The method of claim 13 further including determining a current charge state for the flash, and wherein the determined flash exposure setting is also responsive to the determined current charge state.

21. The method of claim 20 wherein an effective exposure index for the flash is determined responsive to the determined current charge state for the flash, and wherein the flash exposure setting is determined responsive to the effective exposure index for the flash.

22. The method of claim 13 wherein the flash uses a xenon light source or an LED light source.

23. The method of claim 13 wherein the at least one of the preview images is captured using the flash.

24. A method for capturing an improved archival image using an electronic image capture device having a flash, comprising:
  a) determining a scene brightness;
  b) determining a subject distance for the scene;
  c) capturing at least two preview images of a scene at different capture times using the image capture device;
  d) using a processor to analyze the captured preview images to determine a motion velocity for the scene;
  e) determining a flash exposure setting, a total exposure index and an exposure time responsive to the determined subject distance and a ratio of the determined scene brightness divided by the determined motion velocity; and
  f) capturing an archival image using the determined flash exposure setting, the total exposure index and the exposure time;
  wherein step e) includes:
    i) determining an ambient exposure index for an ambient exposure responsive to the ratio of the determined scene brightness divided by the determined motion velocity;
    ii) determining a flash exposure index for a flash-only exposure responsive to the determined subject distance and a flash power level;
    iii) determining the flash exposure setting, the total exposure index and the exposure time responsive to the ambient exposure index and the flash exposure index, wherein the total exposure index is determined by combining the ambient exposure index and the flash exposure index using the equation:

$$EI_T = (1/EI_A + 1/EI_F)^{-1}$$

where $EI_T$ is the total exposure index, $EI_A$ is the ambient exposure index, and $EI_F$ is the flash exposure index.

25. The method of claim 24 wherein the total exposure index is set to be the ambient exposure index and the flash exposure setting is set to a non-flash exposure mode when the ambient exposure index is less than an ambient exposure index threshold.

26. The method of claim 24 wherein the total exposure index is set to be the flash exposure index and the flash setting is set to a flash-only exposure mode when the flash exposure index is less than a flash exposure index threshold.

* * * * *